United States Patent
Shiraki

(10) Patent No.: US 11,797,338 B2
(45) Date of Patent: Oct. 24, 2023

(54) INFORMATION PROCESSING DEVICE FOR READING OBJECT FROM PRIMARY DEVICE SPECIFIED BY IDENTIFICATION, INFORMATION PROCESSING SYSTEM FOR READING OBJECT FROM PRIMARY DEVICE SPECIFIED BY IDENTIFICATION, AND ACCESS CONTROL METHOD FOR READING OBJECT FROM PRIMARY DEVICE SPECIFIED BY IDENTIFICATION

(71) Applicant: FUJITSU LIMITED, Kawasaki (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 296 days.

(21) Appl. No.: 17/129,992

(22) Filed: Dec. 22, 2020

(65) Prior Publication Data

US 2021/0240527 A1 Aug. 5, 2021

(30) Foreign Application Priority Data

Feb. 5, 2020 (JP) .................................. 2020-017959

(51) Int. Cl.
G06F 9/48 (2006.01)
G06F 16/27 (2019.01)

(52) U.S. Cl.
CPC ............ G06F 9/4881 (2013.01); G06F 16/27 (2019.01)

(58) Field of Classification Search
CPC ................................ G06F 9/4881; G06F 16/27
See application file for complete search history.

(56) References Cited

U.S. PATENT DOCUMENTS

2014/0351210 A1* 11/2014 Kawachi ................. G06F 16/27
707/623

FOREIGN PATENT DOCUMENTS

| JP | 2014-229088 A | 12/2014 |
| JP | 2015-22327 A | 2/2015 |
| JP | 2015-170201 A | 9/2015 |

OTHER PUBLICATIONS

Japanese Office Action dated Sep. 5, 2023 for corresponding Japanese Patent Application No. 2020-017959, with English Translation, 6 pages.

* cited by examiner

*Primary Examiner* — Wissam Rashid
(74) *Attorney, Agent, or Firm* — Fujitsu Patent Center

(57) ABSTRACT

An information processing device is configured to store pieces of identification information for identifying a same object, in a case where devices in which the object is to be stored is specified from among information processing devices including the information processing device by calculation using each of the pieces of identification information. The pieces of identification information satisfy that combinations of the devices are the same, the information processing device is included as one of the devices, and primary devices serving as read sources of the object among the devices are different from one another. When one piece of identification information is specified to use the information processing device as the primary device from among the pieces of identification information, and a task arranged by control of a management device is executed to read the object, the primary device is specified based on the one piece of identification information.

7 Claims, 19 Drawing Sheets

| VOLUME ID | OBJECT NAME | NODE SET | PRIMARY FLAG |
|---|---|---|---|
| VOL1 | OBJ1-1 | N1, N2, N3 | 1 |
| | OBJ1-2 | | 0 |
| | OBJ1-3 | | 0 |
| VOL2 | OBJ2-1 | N1, N4, N5 | 0 |
| | OBJ2-2 | | 1 |
| | OBJ2-3 | | 0 |
| ... | ... | ... | ... |

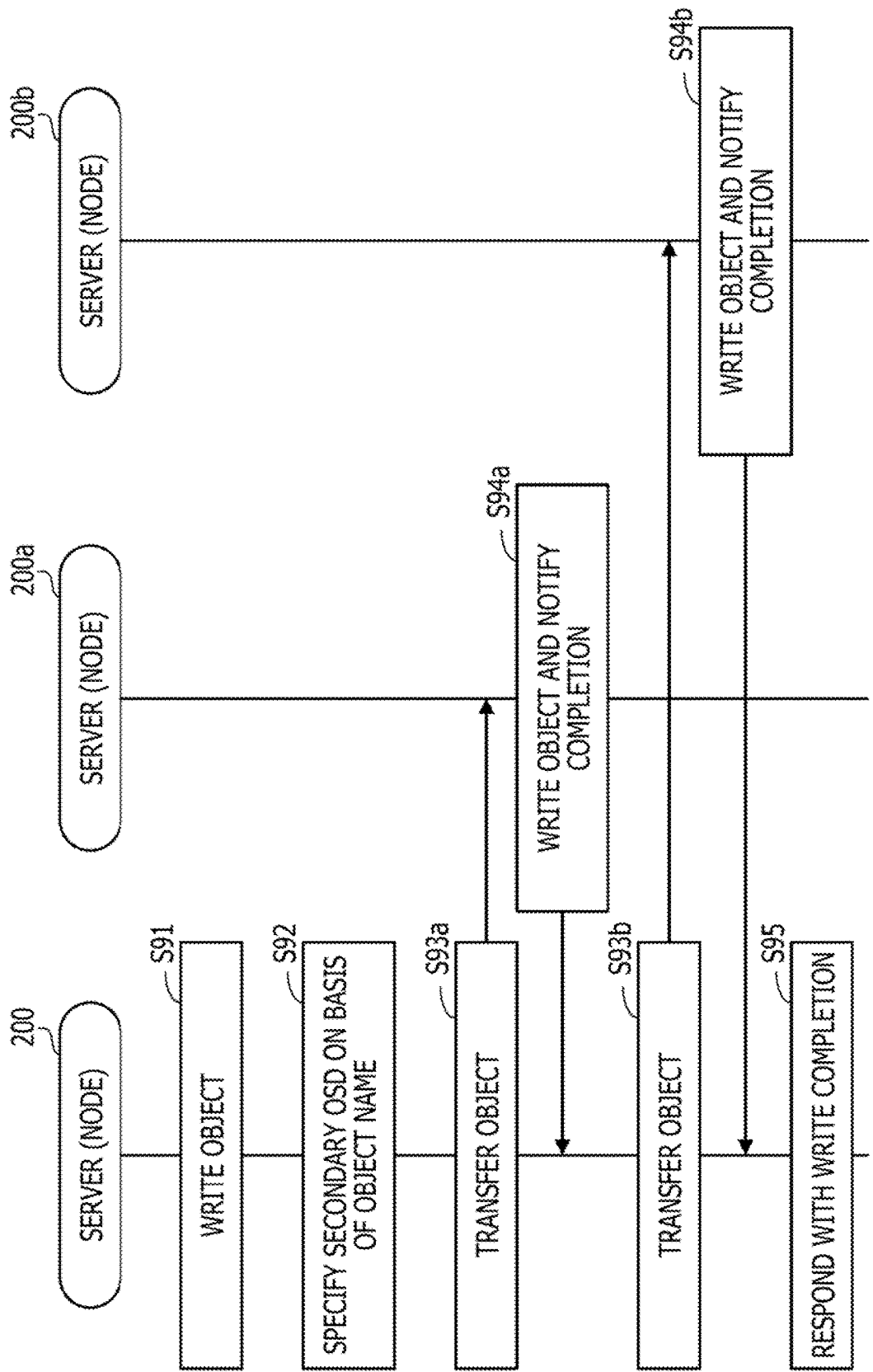

INFORMATION PROCESSING DEVICE FOR READING OBJECT FROM PRIMARY DEVICE SPECIFIED BY IDENTIFICATION, INFORMATION PROCESSING SYSTEM FOR READING OBJECT FROM PRIMARY DEVICE SPECIFIED BY IDENTIFICATION, AND ACCESS CONTROL METHOD FOR READING OBJECT FROM PRIMARY DEVICE SPECIFIED BY IDENTIFICATION

CROSS-REFERENCE TO RELATED APPLICATION

This application is based upon and claims the benefit of priority of the prior Japanese Patent Application No. 2020-17959, filed on Feb. 5, 2020, the entire contents of which are incorporated herein by reference.

FIELD

The embodiments discussed herein are related to an information processing device, an information processing system, and an access control method.

BACKGROUND

Distributed object storage systems are widely used because of their high scalability characteristics. Generally, in such a storage system, the same object is stored in a plurality of locations to make data redundant. For example, in Ceph's object storage system, the controlled replication under scalable hashing (CRUSH) algorithm uniquely determines a plurality of storage locations for the same object from an object name.

Japanese Laid-open Patent Publication No. 2015-170201 and Japanese Laid-open Patent Publication No. 2014-229088 are disclosed as related art.

SUMMARY

According to an aspect of the embodiments, an information processing device includes: a memory; and a processor coupled to the memory and configured to: store a plurality of pieces of identification information for identifying a same object, in a case where a plurality of devices in which the object is to be stored is specified from among a plurality of information processing devices including the information processing device by calculation using each of the plurality of pieces of identification information, the plurality of pieces of identification information satisfying that combinations of the plurality of devices are the same, the information processing device is included as one of the plurality of devices, and primary devices serving as read sources of the object among the plurality of devices are different from one another; and when one piece of identification information is specified to use the information processing device as the primary device from among the plurality of pieces of identification information, and executes a task arranged by control of a management device and reads the object, specify the primary device on a basis of the one piece of identification information, and read the object stored in the specified primary device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating a configuration example of a volume management table;

FIG. 19 is an example of a sequence diagram illustrating a processing procedure of writing an object.

DESCRIPTION OF EMBODIMENTS

Figure 1:
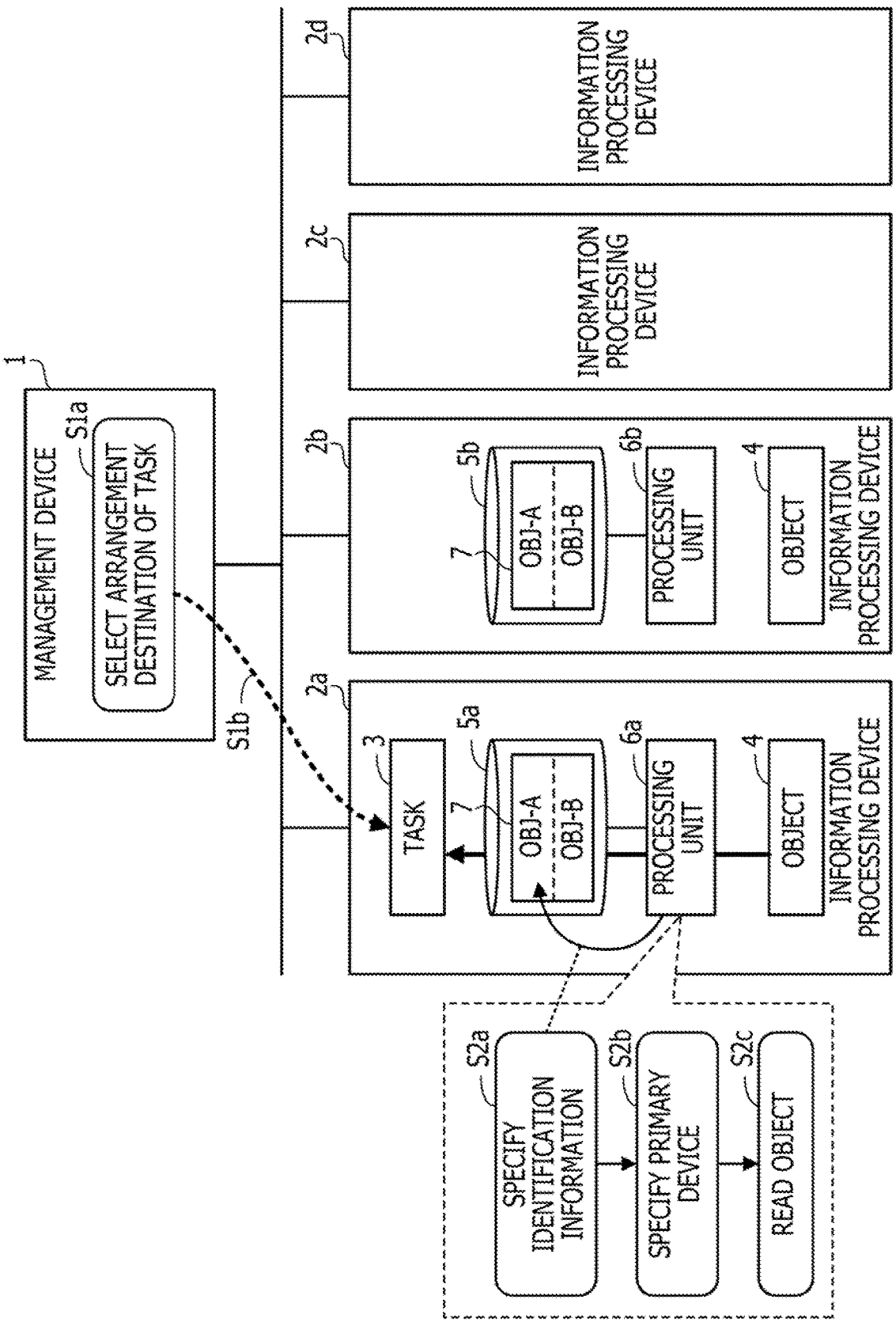
FIG. 1 is a diagram illustrating a configuration example and a processing example of an information processing system according to a first embodiment.

Meanwhile, in recent years, hyper-converged infrastructure (HCI) technology has attracted attention, which integrally implements a storage control function and an application execution function, using a general-purpose server.

Note that there are following proposals regarding the storage system. For example, the following data storage system based on Ceph has been proposed. In this data storage system, a storage control device determines a primary specifier for specifying a storage device closest to a client from among a plurality of storage devices in which the same data is stored, and changes an order of elements in an ordered set of the plurality of storage devices on the basis of the primary specifier. Then, the client accesses the storage device on the basis of the ordered set in which the order of elements has been changed.

Furthermore, the following data processing system has also been proposed. In this data processing system, master data is held in a first node, and slave data obtained by replicating master data is held in a second node. A routing manager changes the slave data in the second node to the master data and replicates the slave data, and holds the replicated slave data in a third node as new slave data.

By the way, in the above CRUSH algorithm, not only the plurality of storage locations for the same object but also a primary storage location among the plurality of storage locations is uniquely determined from the object name. The primary storage location is an access destination when a read is requested, and is a location where the object is first written when a write is requested.

Here, consider a case where the storage control function and the application execution function of the storage system in which a plurality of storage locations of an object is determined from an object name are implemented on a server by the HCI technology. In this case, for example, a management device, which manages execution of each task included in an application, selects a server in which the task is to be arranged from among a plurality of servers that stores an object to be used by the task. In this selection, for example, a server having a resource usage status suitable for execution of the task is selected as a task arrangement destination from among the plurality of servers.

Meanwhile, since the primary storage location of an object is determined from the object name of the object, the task is not necessarily arranged in the server that is the primary storage location of the object to be used. In the case where the server in which the task is arranged, and the server that serves as the primary storage location of the object are different, the object is read from the latter server and is transferred to the former server when reading the object by execution of the task. In this way, transfer of the object occurs between the servers, and there is a problem of a decrease in read speed.

In one aspect, an information processing device, an information processing system, and an access control method by which the read speed for an object is improved may be provided.

Hereinafter, embodiments will be described with reference to the drawings.

First Embodiment

FIG. 1 is a diagram illustrating a configuration example and a processing example of an information processing system according to a first embodiment. The information processing system illustrated in FIG. 1 includes a management device 1 and a plurality of information processing devices. As an example, the information processing system illustrated in FIG. 1 includes four information processing devices 2a to 2d.

The management device 1 manages execution of a task in the information processing devices 2a to 2d. The task is, for example, part of processing by an application. The management device 1 determines a task arrangement destination from the information processing devices 2a to 2d, arranges the task in the information processing device determined as the arrangement destination, and causes the information processing device to execute the task.

The information processing devices 2a to 2d have a function to execute the task arranged by the management device 1 and a storage control function to manage data on an object basis and control an access to the object. Objects are distributed and stored in the information processing devices 2a to 2d. Furthermore, the same object is stored in two or more information processing devices among the information processing devices 2a to 2d, whereby the object is made redundant. Then, the two or more storage locations for the same object are uniquely determined on the basis of an identification number of the object.

In the example in FIG. 1, it is assumed that the same object is stored in two information processing devices. Furthermore, it is assumed that an object 4 used by a task 3 is stored in the information processing devices 2a and 2b.

The information processing device 2a includes a storage unit 5a and a processing unit 6a. The storage unit 5a is implemented as a storage area of a storage device (not illustrated) included in the information processing device 2a. The processing unit 6a is implemented as, for example, a processor (not illustrated) included in the information processing device 2a. Note that the other information processing devices 2b to 2d have similar functions to the storage unit 5a and the processing unit 6a. For example, the information processing device 2b includes a storage unit 5b and a processing unit 6b.

The storage unit 5a of the information processing device 2a stores an identification information group 7 for the object 4. The identification information group 7 includes a plurality pieces of identification information about the same object 4. The plurality pieces of identification information included in the identification information group 7 is pieces of identification information that satisfy the following conditions in a case of specifying a plurality of devices in which the object 4 is to be stored from among the information processing devices 2a to 2d by calculation using each of the pieces of identification information. That is, combinations of the plurality of devices specified by the calculation are the same, and primary devices that serve as read sources of the object 4, of the plurality of specified devices, are different from one another. Moreover, the plurality of specified devices includes the information processing device that holds the identification information group 7.

The number of pieces of identification information included in the identification information group 7 is the same as the number of information processing devices in which the same object 4 is stored, and here, the number is two. In FIG. 1, as an example, the identification information group 7 includes identification information OBJ-A and identification information OBJ-B. These pieces of identification information OBJ-A and OBJ-B are the following information.

In the example in FIG. 1, the object 4 is stored in the information processing devices 2a and 2b. In this case, in the above calculation using each of the identification information OBJ-A and OBJ-B, the information processing devices 2a and 2b are specified as storage destinations for the object 4. That is, the combination of the plurality of devices specified by the calculation is the same regardless of which of the identification information OBJ-A or OBJ-B is used.

Furthermore, in the calculation using the identification information OBJ-A, the information processing device 2a is specified as the primary device, and in the calculation using the identification information OBJ-B, the information processing device 2b is specified as the primary device. That is, in the calculations respectively using the identification information OBJ-A and OBJ-B, the primary devices different from each other are specified.

Note that the identification information group 7 corresponding to the object 4 is also stored in the storage unit 5b of the information processing device 2b in which the same object 4 is stored.

The processing unit 6a executes the task 3 arranged in the information processing device 2a under the control of the management device 1. Furthermore, when reading the object 4 according to the execution of the task 3, the processing unit 6*a* refers to the identification information group 7 and controls the read.

Processing from the arrangement of the task 3 to the read of the object 4 will be described below.

The management device 1 specifies the information processing devices 2*a* and 2*b* in which the object 4 is to be stored from among the information processing devices 2*a* to 2*d*. Then, the management device 1 selects the arrangement destination of the task 3 from the information processing devices 2*a* and 2*b* (step S1*a*). For example, the management device 1 selects the arrangement destination of the task 3 on the basis of a resource usage status in each of the information processing devices 2*a* and 2*b*. As an example in FIG. 1, it is assumed that the information processing device 2*a* is selected as the arrangement destination of the task 3, the management device 1 arranges the task 3 in the information processing device 2*a* (step S1*b*).

The processing unit 6*a* of the information processing device 2*a* specifies the identification information by which the information processing device 2*a* is specified as the primary device from the identification information OBJ-A and OBJ-B included in the identification information group 7 (step S2*a*). In this example, the identification information OBJ-A is specified.

Furthermore, when executing the task 3 and reading the object 4, the processing unit 6*a* specifies the primary device on the basis of the specified identification information OBJ-A (step S2*b*). Then, the processing unit 6*a* reads the object 4 stored in the specified primary device (step S2*c*). Here, in step S2*b*, the information processing device 2*a* is specified as the primary device. Therefore, in step S2*c*, the object 4 stored in the information processing device 2*a* is read.

Furthermore, in a case where the task 3 is arranged in the information processing device 2*b*, for example, the information processing device 2*b* executes the following processing. The processing unit 6*b* of the information processing device 2*b* specifies the identification information OBJ-B by which the information processing device 2*b* is specified as the primary device from the identification information OBJ-A and OBJ-B included in the identification information group 7. Furthermore, when executing the task 3 and reading the object 4, the processing unit 6*b* specifies the primary device on the basis of the specified identification information OBJ-B. The information processing device 2*b* is specified as the primary device, and the processing unit 6*a* reads the object 4 stored in the specified information processing device 2*b*.

By such processing, the object 4 stored in the information processing device 2*a* is read in the case where the task 3 is arranged in the information processing device 2*a*, and the object 4 stored in the information processing device 2*b* is read in the case where the task 3 is arranged in the information processing device 2*b*. Therefore, the time to read the object can be shortened and the read speed can be improved, as compared with a case where one information processing device reads the object 4 stored in another information processing device.

For example, in an algorithm for determining a storage location of an object, not only the storage location but also the primary storage location may be determined from the identification information of the object. In this case, only one primary storage location is determined from one piece of identification information about the object. Meanwhile, the task arrangement destination by the management device 1 is not necessarily the information processing device that is the primary storage location. In the case where the task is arranged in an information processing device different from the information processing device that is the primary storage location, the information processing device in which the task is arranged transmits an access request for the object to the different information processing device when the information processing device accesses the object by executing the task. In this case, the access speed will decrease.

According to the present embodiment, when the desired object 4 is read by executing the task 3, the object 4 stored in the information processing device in which the task 3 is arranged can be read. Therefore, the read speed may be improved.

Second Embodiment

Figure 2:
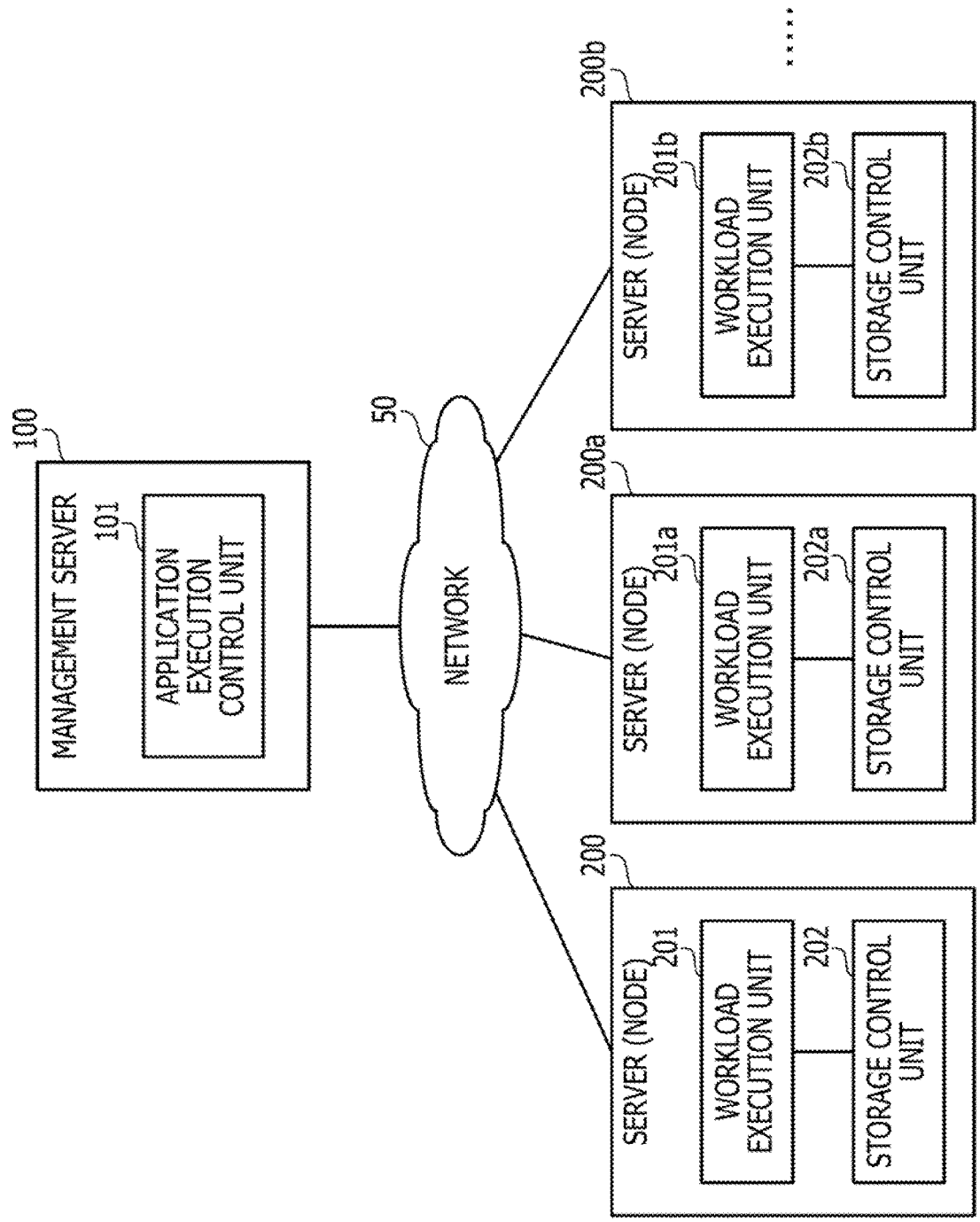
FIG. 2 is a diagram illustrating a configuration example of an information processing system according to a second embodiment.

FIG. 2 is a diagram illustrating a configuration example of an information processing system according to a second embodiment. The information processing system illustrated in FIG. 2 includes a management server 100 and servers 200, 200*a*, 200*b*, and the like. The management server 100 and the servers 200, 200*a*, 200*b*, and the like are connected to one another via a network 50. Note that the management server 100 and the servers 200, 200*a*, 200*b*, and the like are implemented as, for example, general-purpose server computers.

The management server 100 includes an application execution control unit 101 that controls execution of an application using the servers 200, 200*a*, 200*b*, and the like. Processing of the application execution control unit 101 is implemented when, for example, a processor included in the management server 100 executes a predetermined program.

Application processing is managed in units of partial processing called "workload". The application execution control unit 101 selects a server to deploy the workload from the servers 200, 200*a*, 200*b*, and the like, deploys the workload to the selected server, and causes the selected server to execute the workload.

Note that the workload is implemented as a task, for example. Furthermore, for example, the workload may be implemented as a container in a case of using a container-type virtualization technology. In this case, for example, when container information indicating a virtual process execution environment corresponding to the container is transmitted from the management server 100 to a server, the container is deployed in the server. Then, the container is activated in the server on the basis of the container information.

Meanwhile, each of the servers 200, 200*a*, 200*b*, and the like has a workload execution function and a storage control function to control an access to a storage. For example, the server 200 includes a workload execution unit 201 as the workload execution function and a storage control unit 202 as the storage control function. The workload execution unit 201 executes the workload deployed by the management server 100. The storage control unit 202 uses a storage device (local storage) included in the server 200 as a storage area of an object storage, and controls accesses to the storage area on an object basis.

The server 200*a* includes a workload execution unit 201*a* and a storage control unit 202*a*. The server 200*b* includes a workload execution unit 201*b* and a storage control unit 202*b*. The workload execution units 201*a* and 201*b* execute processing similar to the workload execution unit 201 of the server 200. The storage control units 202a and 202b execute processing similar to the storage control unit 202 of the server 200.

Note that the processing of the workload execution unit 201, 201a, 201b, or the like and the storage control unit 202, 202a, 202b, or the like is implemented when a processor of the server on which the respective units are mounted executes a predetermined program.

In the information processing system having the above configuration, a distributed object storage system in which each of the local storages of the servers 200, 200a, 200b, and the like are used as the storage areas by the storage control units 202, 202a, 202b, and the like is implemented. Furthermore, an HCI system is implemented as the storage control function and the application (workload) execution function are mounted in each of the servers 200, 200a, 200b, and the like.

Here, in the present embodiment, it is assumed that a Ceph object storage system is implemented as an example. The servers 200, 200a, 200b, and the like respectively operate as "nodes (storage nodes)" in Ceph.

Figure 3:
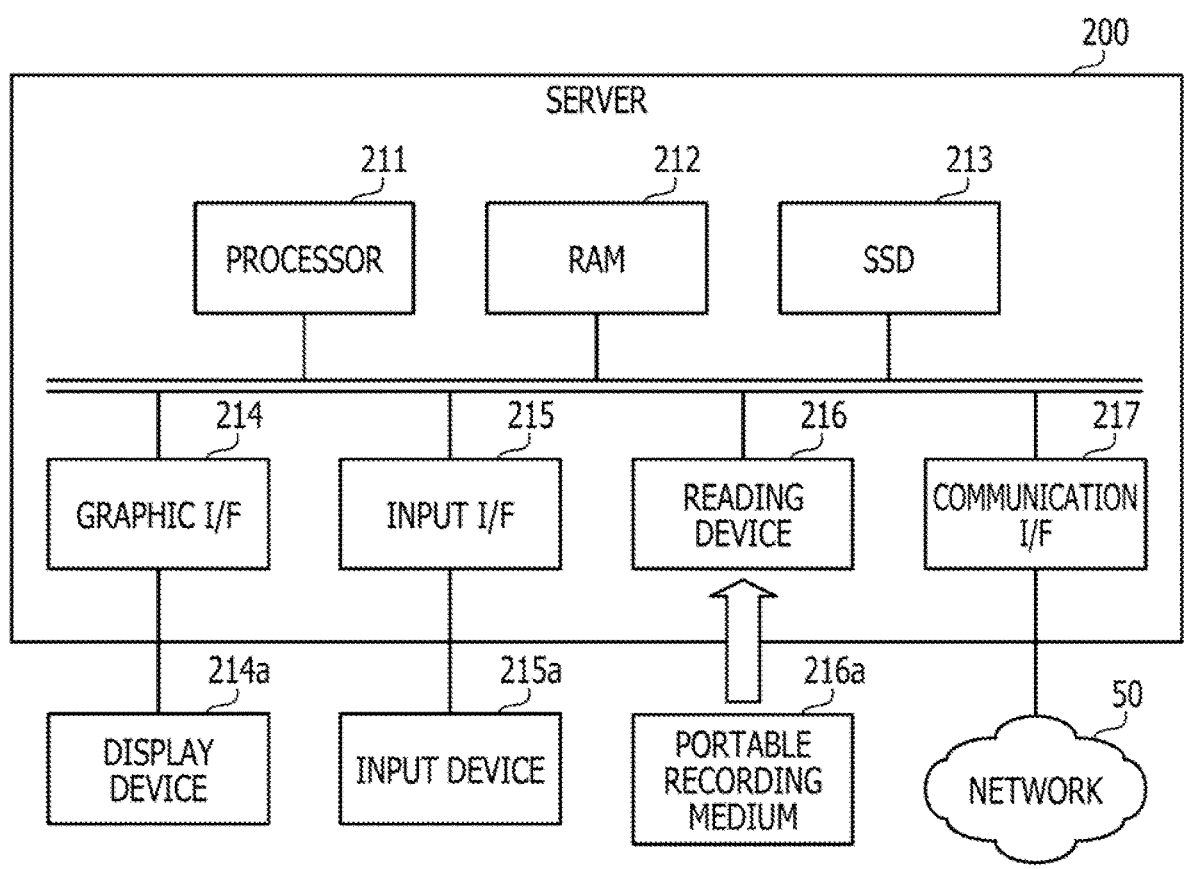
FIG. 3 is a diagram illustrating a hardware configuration example of a server.

FIG. 3 is a diagram illustrating a hardware configuration example of a server. The server 200 is implemented as, for example, a computer as illustrated in FIG. 3.

The server 200 includes a processor 211, a random access memory (RAM) 212, a solid state drive (SSD) 213, a graphic interface (I/F) 214, an input interface (I/F) 215, a reading device 216, and a communication interface (I/F) 217.

The processor 211 integrally controls the entire server 200. The processor 211 is, for example, a central processing unit (CPU), a micro processing unit (MPU), a digital signal processor (DSP), an application specific integrated circuit (ASIC), or a programmable logic device (PLD). Furthermore, the processor 211 may be a combination of two or more elements of the CPU, MPU, DSP, ASIC, and PLD.

The RAM 212 is used as a main storage device of the server 200. The RAM 212 temporarily stores at least a part of an operating system (OS) program and an application program to be executed by the processor 211. Furthermore, the RAM 212 further stores various data needed for the processing by the processor 211.

The SSD 213 is used as an auxiliary storage device of the server 200. The SSD 213 stores an OS program, an application program, and various data. Further, the SSD 213 is a storage device that implements a part of the storage area of the distributed object storage. Note that another type of nonvolatile storage device such as a hard disk drive (HDD) can also be used as the auxiliary storage device.

The graphic interface 214 is connected to a display device 214a. The graphic interface 214 displays an image on the display device 214a according to a command from the processor 211. Examples of the display device 214a include a liquid crystal display, an organic electroluminescence (EL) display, and the like.

The input interface 215 is connected to an input device 215a. The input interface 215 transmits a signal output from the input device 215a to the processor 211. Examples of the input device 215a include a keyboard, a pointing device, and the like. Examples of the pointing device include a mouse, a touch panel, a tablet, a touch pad, a track ball, and the like.

A portable recording medium 216a is attached to and detached from the reading device 216. The reading device 216 reads data recorded on the portable recording medium 216a and transmits the data to the processor 211. Examples of the portable recording medium 216a include an optical disc, a magneto-optical disc, a semiconductor memory, and the like.

The communication interface 217 transmits and receives data to and from another device such as the management server 100 via the network 50.

Processing functions of the server 200 can be implemented by the above-described hardware configuration. Note that the servers 200a, 200b, and the like and the management server 100 can also be implemented as computers having the configuration illustrated in FIG. 3.

Figure 4:
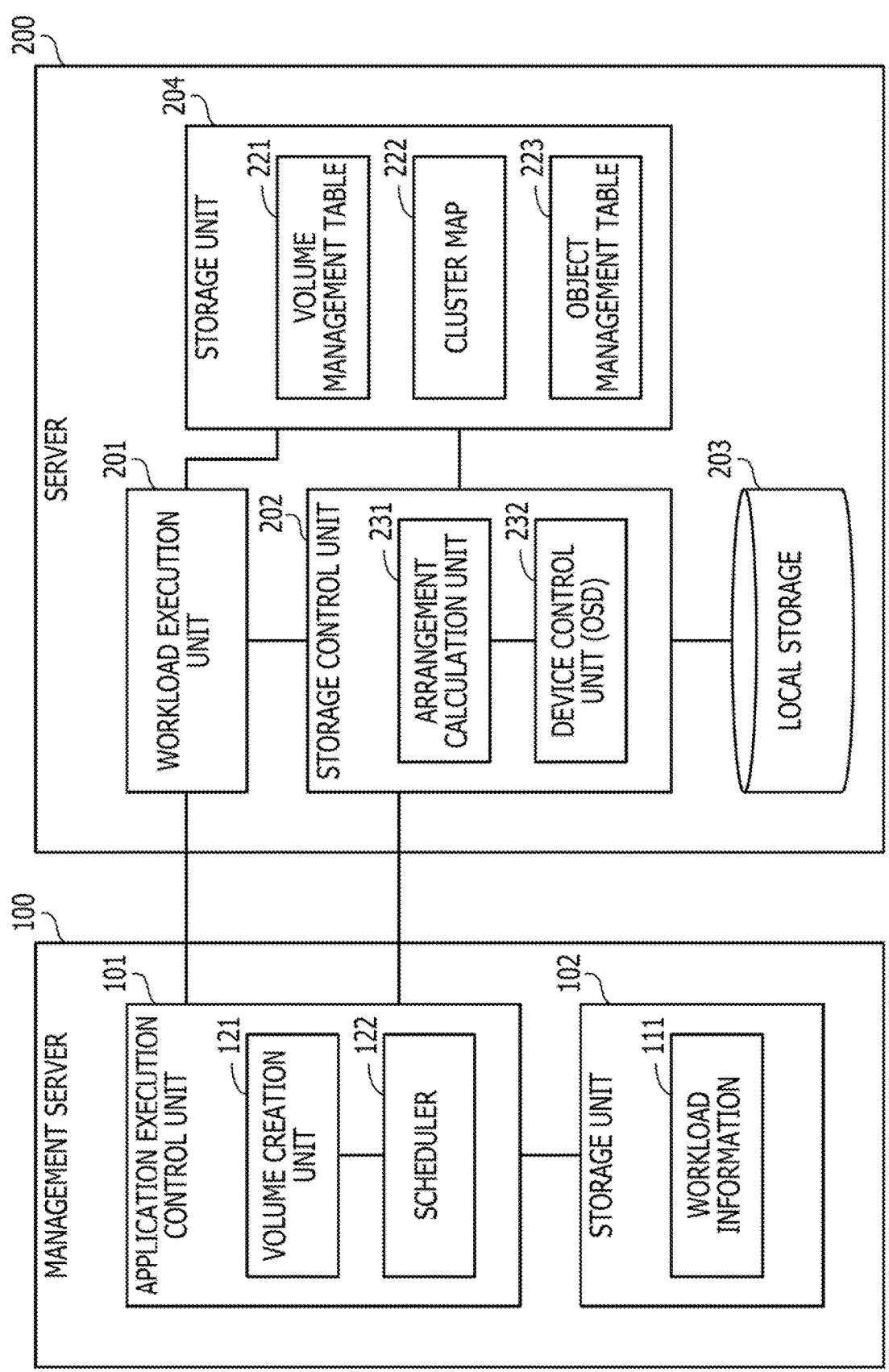
FIG. 4 is a diagram illustrating a configuration example of process functions of a management server and a server.

FIG. 4 is a diagram illustrating a configuration example of the process functions of the management server and the server.

First, the management server 100 includes a storage unit 102 in addition to the above-described application execution control unit 101. The storage unit 102 is implemented by the storage area included in the management server 100.

The storage unit 102 stores workload information 111. Information regarding each workload included in an application is registered in the workload information 111. For example, in the workload information 111, information indicating a volume accessed by a workload and information regarding a resource requested to the server side for executing the workload (resource request information) are registered. As the resource request information, for example, CPU ability, memory capacity, storage area capacity to be reserved for the volume, and the like are registered.

The application execution control unit 101 includes a volume creation unit 121 and a scheduler 122. The volume creation unit 121 creates the volume to be used by the workload. The volume is a logical storage area in which an object is stored. As described below, when the volume is mounted to the workload deployed in the server, the workload becomes accessible to the object in the volume. The scheduler 122 determines a deployment destination server for the workload on the basis of the resource request information corresponding to the workload and the resource usage status in each of the servers 200, 200a, 200b, and the like. The scheduler 122 deploys the workload to the server determined as the deployment destination and starts the operation of the workload.

Next, the server 200 includes a local storage 203 and a storage unit 204 in addition to the workload execution unit 201 and the storage control unit 202 described above. Note that the other servers 200a, 200b, and the like have similar processing functions to the server 200 although not illustrated.

The local storage 203 is a storage that implements a part of the storage area of the object storage system, and is implemented by a storage device included in the server 200 such as the SSD 213 in FIG. 3. The storage unit 204 is implemented by the storage area of the storage device included in the server 200 such as the RAM 212.

The storage unit 204 stores a volume management table 221, a duster map 222, and an object management table 223. Information indicating correspondence between the volume and the object is registered in the volume management table 221. Information indicating the configuration of the Ceph object storage system is registered in the duster map 222. In the duster map 222, for example, information regarding configurations of a node (server) included in the system, an object storage device (OSD) to be described below arranged in the node, or the like is registered. In the object management table 223, the object name of the object stored in the local storage 203 and information indicating a storage destination are registered.

The workload execution unit 201 executes the workload deployed by the scheduler 122. Furthermore, the workload execution unit 201 mounts the volume to the workload in response to an instruction from the scheduler 122, and accesses the object in the volume by requesting the storage control unit 202 to access the volume.

The storage control unit 202 includes an arrangement calculation unit 231 and a device control unit 232. The arrangement calculation unit 231 obtains a position of an OSD corresponding to the local storage 203 in which the object is stored by calculation based on the object name. The device control unit 232 executes access processing for the local storage 203. The device control unit 232 operates as an OSD in the Ceph object storage system.

The OSD is provided for each local storage and executes the access processing for the corresponding local storage. At least one OSD is provided for each of the servers 200, 200a, 200b, and the like, and each OSD executes the access processing for the local storage of the server (node) in which the OSD itself is provided. In the case where one server (node) is provided with a plurality of local storages, the server is provided with an individual OSD for each local storage.

The arrangement calculation unit 231 determines an access destination OSD (device control unit) on the basis of the object name from the large number of OSDs provided in this way, and requests the OSD to access the object. In the case where the access destination is determined to be the OSD of another server (node), the arrangement calculation unit 231 requests the OSD of the other server to access the object.

Note that the local storage 203 may be implemented by one physical storage device or may be implemented by a plurality of physical storage devices. For example, the local storage 203 may be implemented by a plurality of physical storage devices controlled by redundant array of inexpensive disks (RAID).

Figure 5:
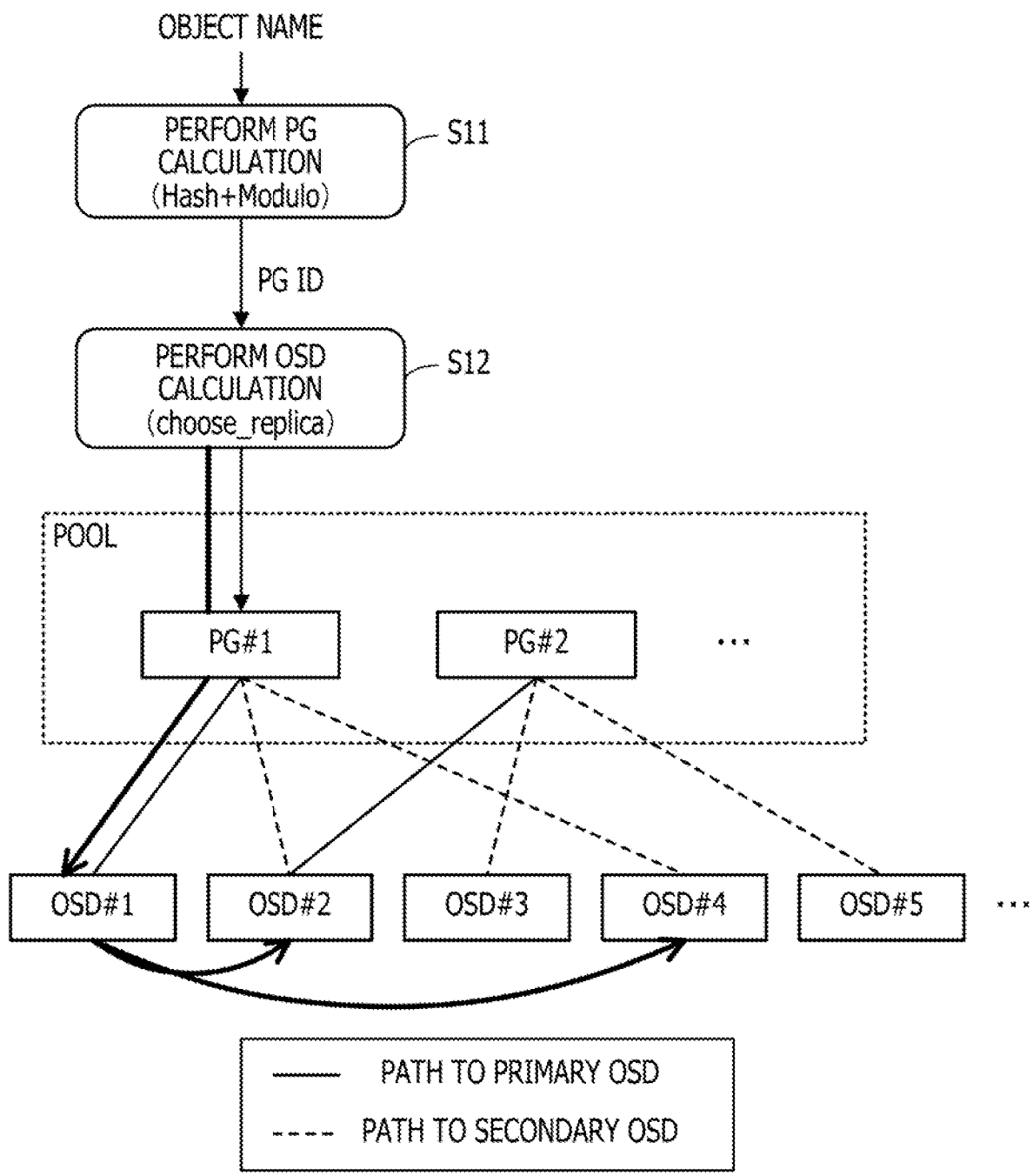
FIG. 5 is a diagram for describing a method of allocating an OSD in Ceph.

FIG. 5 is a diagram for describing a method of allocating an OSD in Ceph. As described above, at least one OSD is provided in each node. Each OSD executes the access processing for the corresponding local storage. The OSDs and the local storages are associated such that the access destinations of each ODS become different physical storage devices from one another.

An object is stored in local storages corresponding to a plurality of OSDs provided in different nodes. This makes the object redundant. Hereinafter, each of redundant objects (the same objects stored under different OSDs will be referred to as a "replica". Furthermore, in the following description, the number of replicas for each object is set to "3" as an example. In this case, the objects with the same object name are respectively stored in the local storages corresponding to the OSDs on three different nodes. Note that, in the following description, an object (or replica) being stored in the local storage corresponding to the OSD may be simply described as "the object (or replica) is stored in the OSD".

One of the OSDs in which the three replicas are stored is a primary OSD, and the other two OSDs are secondary OSDs. In a case where a read of the object is requested, the replica stored on the primary OSD is read. Furthermore, when a write of the object is requested, first, the object is written in the primary OSD, then the object is transferred from the primary OSD to the two secondary OSDs, and the object is written in each of the secondary OSD. When the write to the three OSDs is complete, a response indicating write completion is sent.

Furthermore, in the Ceph object storage system, the storage area is managed as a "pool", and the pool is divided into "placement groups (PGs)" and managed. A PG can also be said to be a management unit for one or more objects. The three OSDs (one primary OSD and two secondary OSDs) provided in different nodes are allocated to each of the PG.

The allocation of PGs to objects and the allocation of primary and secondary OSDs to PGs are determined using the following CRUSH algorithm.

First, calculation for determining a PG is performed on the basis of the object name (step S11). In this calculation, a hash value of the object name is calculated, and a remainder operation for obtaining a remainder of when the hash value is divided by the number of PGs (the number of existing PGs) is performed. A PG ID for identifying the PG is obtained by the calculation.

Next, calculation for determining the OSD is performed on the basis of the obtained PG ID and the duster map 222 (step S12). In this calculation, for example, a function choose_replica is used. The PG ID and a replica number idx are input as arguments of the function choose_replica, and an OSD ID is output as a return value. In the case where the replica number idx=0 is input, the OSD ID of the primary OSD is output. In the case where the replica number idx=1 is input, the OSD ID of the first secondary OSD is output. In the case where the replica number idx=2 is input, the OSD ID of the second secondary OSD is output.

In CRUSH, the object is classified to the PG and managed, and the storage destination of the object is determined for each PG, whereby the object is efficiently distributed and arranged to the storage area of the node included in the object storage system.

By the way, in the OSD calculation immediately after the access request to the object is issued, usually, the replica number idx=0 is first input as the argument, and the OSD ID of the primary OSD is output accordingly. Hereinafter, the processing procedure when an access request is issued will be described with reference to FIG. 5.

FIG. 5 illustrates PG #1, PG #2, and the like, and OSD #1, OSD #2, OSD #3, OSD #4, OSD #5, and the like. For example, when a certain object name is specified and an access to an object is requested, it is assumed that the PG ID indicating the PG #1 is calculated in the PG calculation, and the OSD ID indicating the OSD #1 is calculated as the primary OSD in the next OSD calculation.

In this case, the access request for the object is input to the OSD #1 (device control unit), and the OSD #1 accesses the object in the corresponding local storage.

In the case where the access request is a read request, the OSD #1 reads the object and responds to the read request. On the other hand, in the case where the access request is a write request, the OSD #1 writes the object to the corresponding local storage. Moreover, the OSD #1 itself (or the node provided with the OSD #1) performs the PG calculation and the OSD calculation to obtain the OSD ID of the primary OSD. In the OSD calculation, the replica numbers idx=1, 2 are input respectively and the function choose_replica is executed, so that the OSD IDs of the two secondary OSDs are calculated.

In FIG. 5, it is assumed that the OSDs #2 and #4 are specified as the secondary OSDs, for example. In this case, the OSD #1 transfers the object to the OSDs #2 and #4 and requests a write. The OSDs #2 and #4 write the received object in the respective corresponding local storages. When such a write is complete, a response to the write request is sent.

Figure 6:
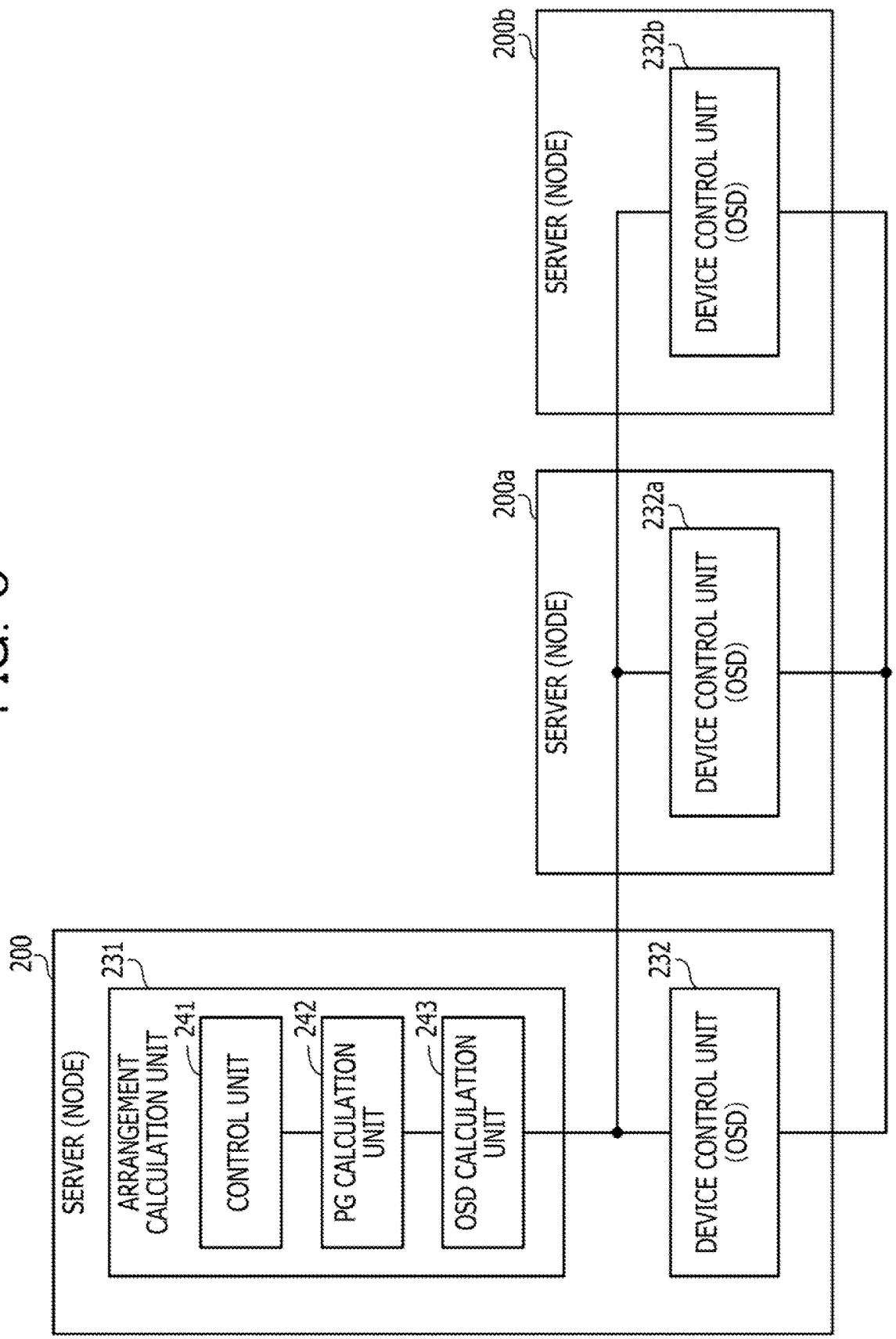
FIG. 6 is a diagram illustrating an internal configuration example of an arrangement calculation unit.

FIG. 6 is a diagram illustrating an internal configuration example of an arrangement calculation unit. As illustrated in FIG. 6, the arrangement calculation unit 231 includes a control unit 241, a PG calculation unit 242, and an OSD calculation unit 243.

The control unit 241 controls the processing of the entire arrangement calculation unit 231. For example, when the control unit 241 receives the access request for the volume from the started workload, the control unit 241 acquires the object name of the object included in the volume from the volume management table 221. Then, the control unit 241 outputs the acquired object name to the PG calculation unit 242 to start the PG calculation.

The PG calculation unit 242 calculates the PG ID on the basis of the input object name. The OSD calculation unit 243 calculates the OSD ID on the basis of the calculated PG ID and the duster map 222. In the case where the PG ID is calculated in response to the access request from the workload, the OSD calculation unit 243 inputs the replica number idx=0 as the argument of the function choose_replica. As a result, the OSD ID indicating the primary OSD is calculated.

The OSD calculation unit 243 outputs the access request for the object to the OSD (device control unit) indicated by the OSD ID. Here, the calculated primary OSD does not necessarily exist in the node (the server 200 in FIG. 6) in which the OSD calculation unit 243 is provided. Therefore, the OSD calculation unit 243 may output the access request not only to the OSD (device control unit 232) of the node in which the OSD calculation unit 243 itself is provided but also to the OSD of another node (server).

FIG. 6 illustrates a device control unit 232a included in the server 200a and a device control unit 232b included in the server 200b. For example, in the case where the OSD ID corresponding to the device control unit 232a of the server 200a is calculated as the primary OSD, the OSD calculation unit 243 of the server 200 transmits the access request for the object to the device control unit 232a.

Furthermore, in the case where the access request is a write request, the device control unit writes the object and causes the PG calculation unit and OSD calculation unit on the node (server) in which the device control unit itself is provided to calculate the OSD ID of the secondary OSD. For example, in the case where the device control unit 232a is the primary OSD, the device control unit 232a writes the object and then calculates the OSD ID of the secondary OSD using the PG calculation unit and the OSD calculation unit (neither illustrated) of the server 200a as a calculation engine. In this calculation, the replica numbers idx=1, 2 are input as the arguments of the function choose_replica. When the device control units 232 and 232b are specified as the secondary OSDs by the calculation, the device control unit 232a transfers the object to the device control units 232 and 232b to write the object.

Figure 7:
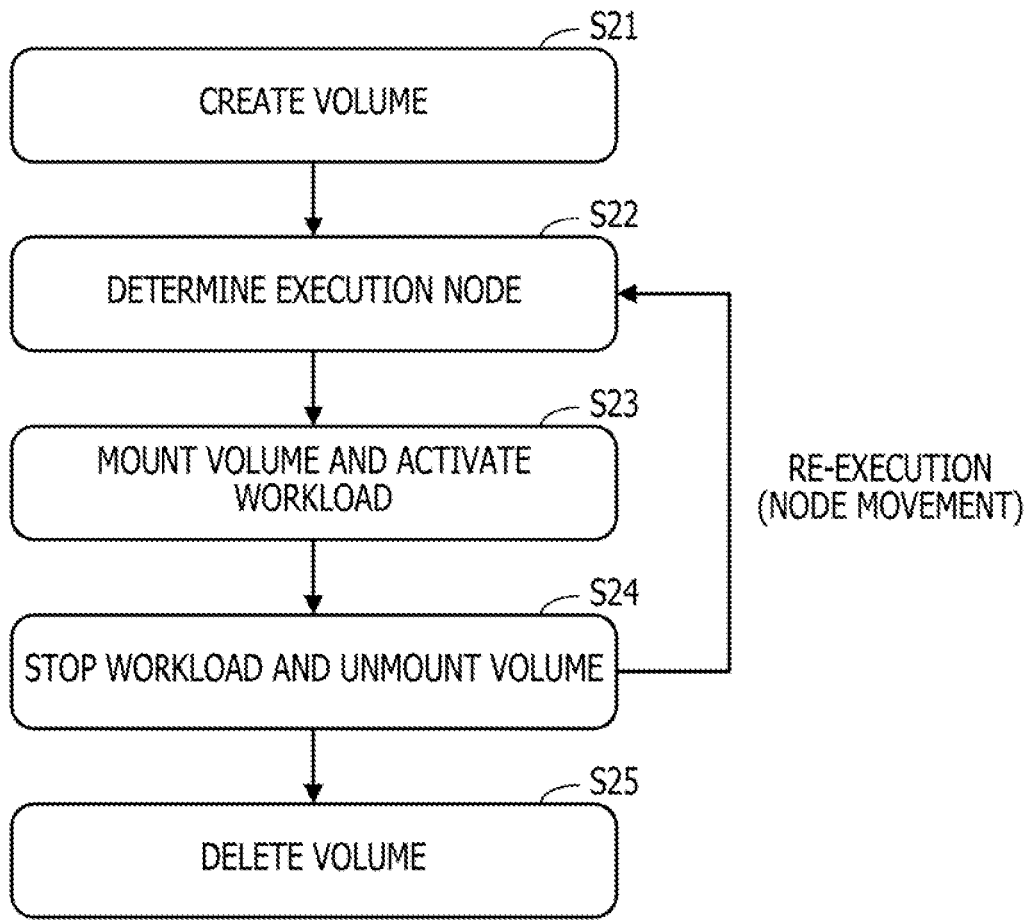
FIG. 7 is a flowchart illustrating a life cycle of a volume and a workload.

Next, FIG. 7 is a flowchart illustrating a life cycle of a volume and a workload. To enable the workload deployed in the node to operate while accessing the object, the volume to serve as the storage destination of the object is created in advance, and the volume needs to be mounted to the workload.

As illustrated in FIG. 7, first, the volume is created (step S21). At this time, the object name of the object included in the volume is also created, and the node in which the replica of the object is to be stored is determined on the basis of the object name.

Next, the node on which the workload is to be executed is determined (step S22). In this processing, the resource request information corresponding to the workload is acquired from the workload information 111. Then, the node that satisfies resource conditions indicated by the resource request information among the nodes in which the replicas of the object corresponding to the volume are stored is determined as an execution node.

Next, the workload is deployed to the determined execution node, and the volume is mounted to the workload. Thereby, the workload becomes accessible to the object in the volume. Then, the workload is then activated (step S23).

Here, for example, in a case where a processing load on the node in which the workload is executed becomes high or the like, for example, there are some cases where the operation of the workload is stopped once, and the deployment destination of the workload is moved to another node. When the operation of the workload is stopped, the volume is unmounted from the workload (step S24). In the case of moving the deployment destination of the workload, a node that satisfies the resource conditions indicated by the resource request information is determined again as a moving destination from among the nodes in which the replicas of the object corresponding to the volume are stored (step S22).

Furthermore, for example, when the operation of the workload is completed and the operation is terminated, the operation of the workload is stopped and the volume is unmounted from the workload (step S24). Then, the unmounted volume is deleted (step S25).

By the way, in step S22 in FIG. 7, as described above, a node that satisfies the resource conditions indicated by the resource request information is selected as the execution node from among the nodes in which the replicas of the object corresponding to the volume are stored. In this processing, the scheduler 122 of the management server 100 transmits a volume ID indicating the volume to at least one node (server) and inquiries about the node (replica node) in which the replica of the object in the volume is stored. The scheduler 122 recognizes three replica nodes as a result of the inquiry, and determines the node that satisfies the resource conditions indicated by the resource request information as the execution node of the workload from among these replica nodes.

By such processing, the workload is deployed to one of the nodes in which the replicas of the object corresponding to the volume are stored. Here, the relationship between the deployed workload and the OSD in which the replica of the object is stored will be described with reference to FIGS. 8 and 9.

Figure 8:
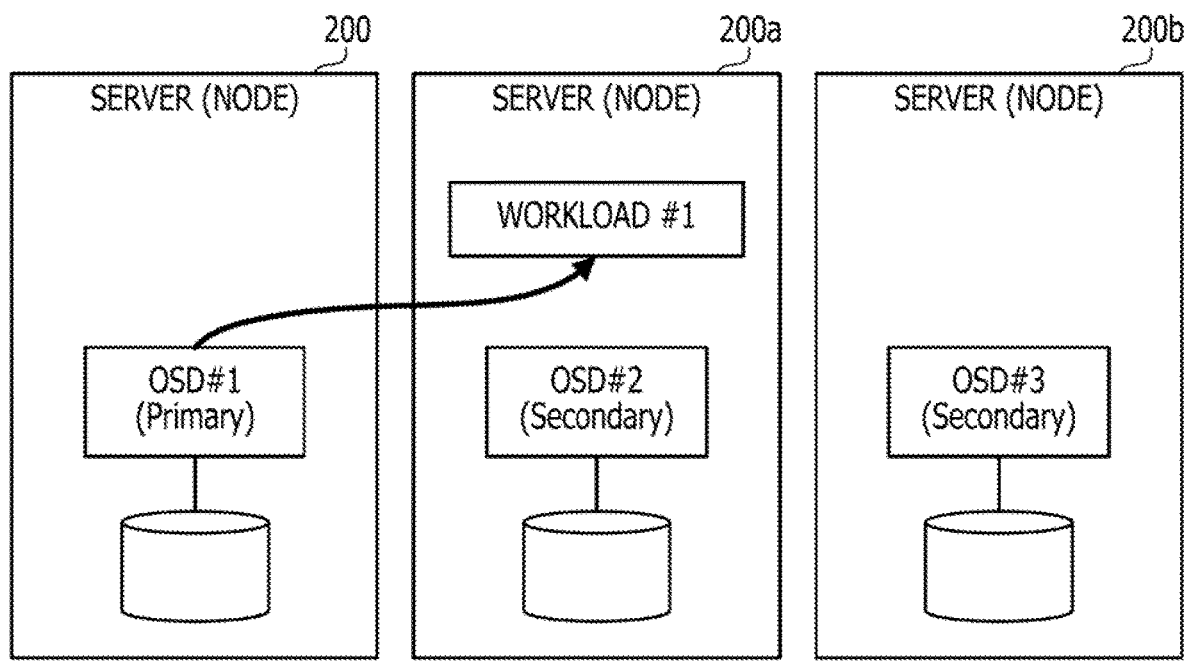
FIG. 8 is a first diagram illustrating a relationship between a workload and an OSD.
Figure 9:
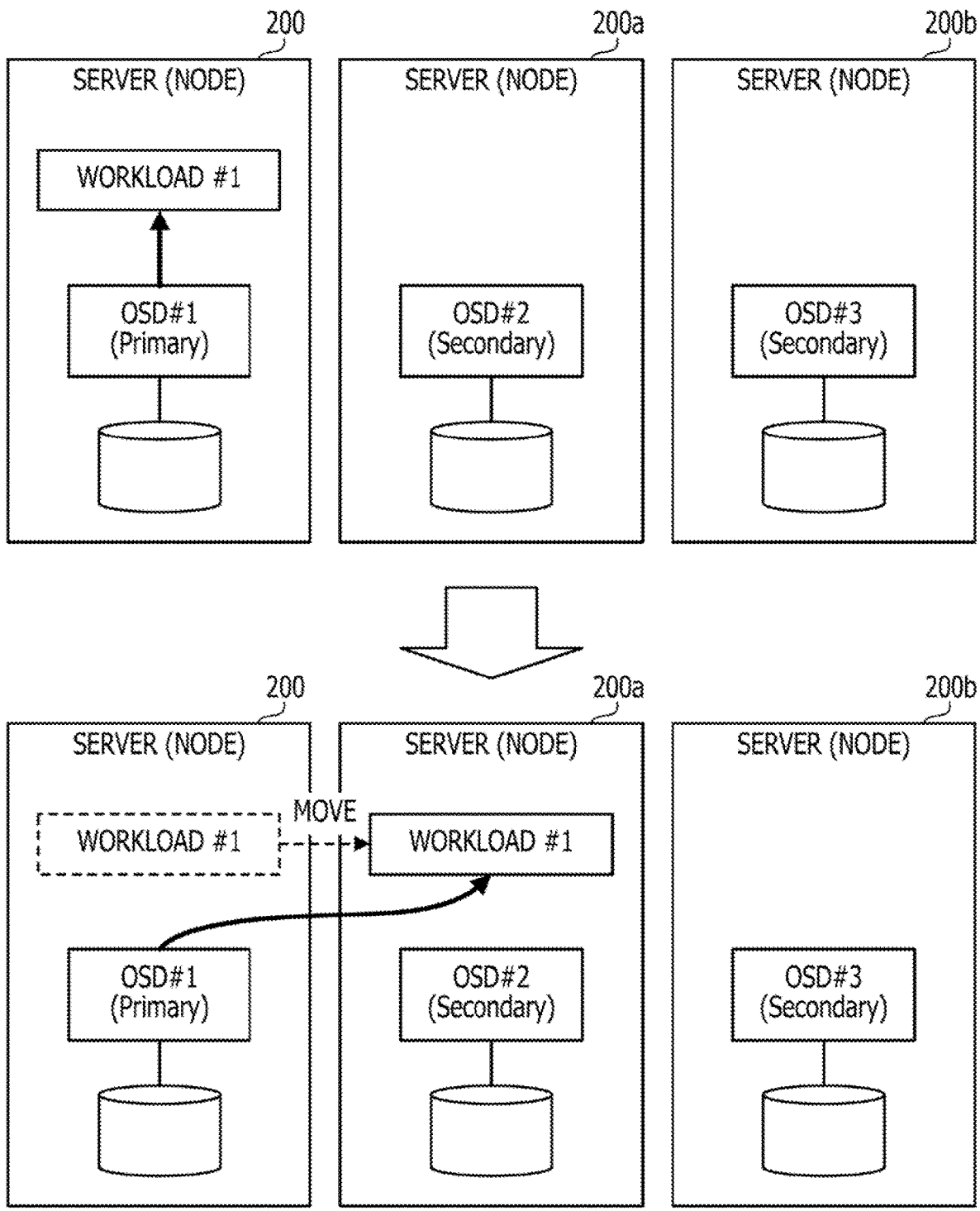
FIG. 9 is a second diagram illustrating a relationship between a workload and an OSD.

FIG. 8 is a first diagram illustrating a relationship between a workload and an OSD. Furthermore, FIG. 9 is a second diagram illustrating a relationship between a workload and an OSD. As an example, it is assumed that the OSDs #1, #2, and #3 are present in the servers 200, 200a, and 200b, respectively, both in FIGS. 8 and 9. Furthermore, it is assumed that the replicas of the object included in the access destination volume of workload #1 are stored in the OSDs #1, #2, and #3. Moreover, it is assumed that the OSD #1 is the primary OSD for this object and the OSDs #2 and #3 are the secondary OSDs.

In such a case, the workload #1 is deployed to one of the servers 200, 200a, and 200b by the above-described processing of the scheduler 122. However, which of the servers 200, 200a, and 200b the workload #1 is deployed to is determined according to the resource usage statuses of the servers 200, 200a, and 200b, respectively.

Therefore, as illustrated in FIG. 8, the workload #1 may be deployed in the node where the secondary OSD is present. In the example in FIG. 8, the workload #1 is deployed in the server 200a where the OSD #2, which is the secondary OSD, is present. In this case, when the workload

1 tries to access the object, the OSD ID of the OSD #1 is calculated by the OSD calculation, and the OSD calculation unit 243 of server 200a transmits the access request to the OSD #1 of the server 200.

In the case where the access request is a read request, the object read by the OSD #1 is transferred from the server 200 to the server 200a and passed to the workload #1, as illustrated by the arrow in FIG. 8. As described above, there is a problem that the time from issuance of the read request to the response becomes longer by the time of transferring the object between the servers (nodes).

Furthermore, in the case where the access request is a write request, the time from issuance of the write request to the response also becomes long. For example, in the case where the OSD #2 is the primary OSD, the object is transferred from the server 200a to the servers 200 and 200b after the object is written by the OSD #2. Then, the object is written by the OSDs #1 and #3. In this case, the object is transferred between the servers twice.

Meanwhile, in the case in FIG. 8, the object is first transferred from the server 200a to the server 200, and the object is written by the OSD #1. Next, the object is transferred from the server 200 to the servers 200a and 200b, and the object is written by the OSD #2 and #3. In this case, the object is transferred between the servers three times. As the number of object transfers increases in this way, the time from the issuance of the write request to the response becomes longer.

Moreover, the deployment destination of the workload may be moved, as illustrated in FIG. 9. In the case in FIG. 9, the workload #1 is moved from server 200 to server 200a. As such a case, for example, a case where a processing load on the server 200 is high or a case where a processing load on the server 200a is relatively lower than the processing load of the server 200 is conceivable.

Before the movement of the workload #1, the workload #1 is deployed in the server 200 where the primary OSD is present, as illustrated in the upper part in FIG. 9. Meanwhile, after the movement of the workload #1, the workload #1 is deployed in the server 200a where the secondary OSD is present, as illustrated in the lower part in FIG. 9. Therefore, in the case in FIG. 9, there is a problem that the time to access the object increases due to the movement of the workload #1.

Therefore, in the present embodiment, as will be described in FIG. 10 below, three object IDs are created in advance, in which combinations of calculated OSD IDs are the same, and the primary OSDs are different from one another, regarding one object. Then, in the node to which the workload is deployed, the object ID by which the OSD in its own node becomes the primary OSD is selected from among the three object IDs, and the object is accessed using the selected object ID.

Figure 10:
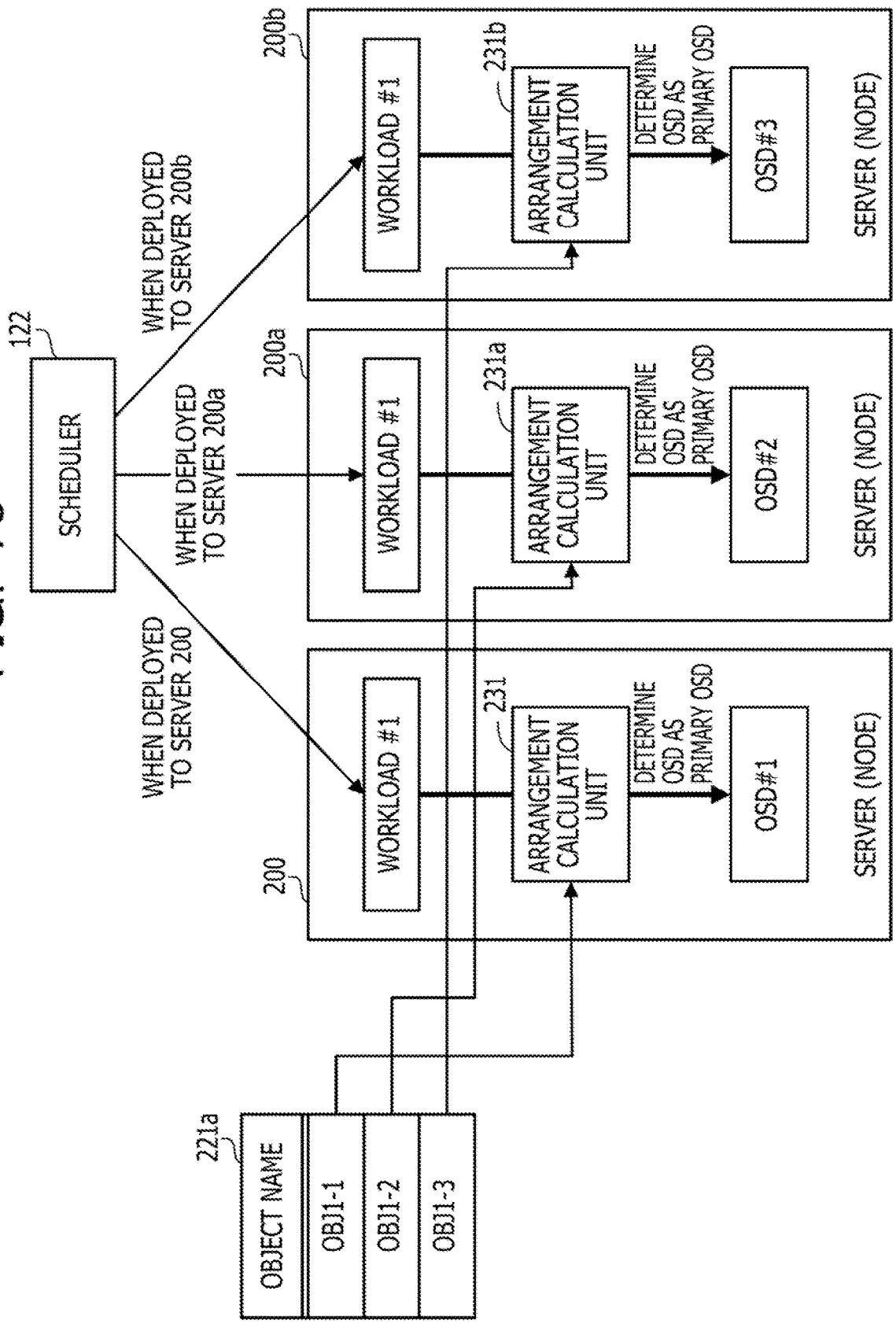
FIG. 10 is a diagram for describing a method of allocating an OSD in the second embodiment.

FIG. 10 is a diagram for describing a method of allocating an OSD in the second embodiment. In FIG. 10, as an example, it is assumed that calculation is performed such that the replicas of the same object are stored in the OSDs #1, #2, and #3 existing in the servers 200, 200a, and 200b, respectively.

In the present embodiment, three different object names are created in processing of creating an object name of a certain object. Object information 221a including the created three object names is registered and retained at least in the object management table 223 of each node (that is, the server 200, 200a, or 200b) in which the object is stored.

In the example in FIG. 10, object names OBJ1-1, OBJ1-2, and OBJ1-3 are created and described in the object information 221a. When the OSD calculation is performed respectively using the object names OBJ1-1, OBJ1-2, and OBJ1-3, the OSD IDs indicating the OSD #1, #2, and #3 are calculated, and the primary OSDs are different from one another. Here, as an example, it is assumed that the OSD #1 is specified as the primary OSD in the case of using the object name OBJ1-1, the OSD #2 is specified as the primary OSD in the case of using the object name OBJ1-2, and the OSD #3 is specified as the primary OSD in the case of using the object name OBJ1-3.

For example, in the case where the workload #1 is deployed to the server 200 under the control of scheduler 122, the object name OBJ1-1 is selected from the object information 221a. This selection processing is performed, for example, by calculating the OSD ID using each of the object names OBJ1-1, OBJ1-2, and OBJ1-3, and specifying the object name by which the OSD ID of the OSD (OSD #1 in this case) of its own node is calculated. The selected object name OBJ1-1 is recorded in the volume management table 221 as the object name to be used by the server 200.

Then, when the workload #1 deployed to the server 200 accesses the object, the arrangement calculation unit 231 of the server 200 calculates the OSD ID of the primary OSD using the selected object name OBJ1-1. As a result, the OSD #1 in the server 200 is determined to be the primary OSD, and the OSD #1 is requested to access the object.

Furthermore, in the case where the workload #1 is deployed to the server 200a, the object name OBJ1-2 is selected from the object information 221a. Then, when the workload #1 accesses the object, the arrangement calculation unit 231a of the server 200a calculates the OSD ID of the primary OSD using the selected object name OBJ1-2. As a result, the OSD #2 in the server 200a is determined to be the primary OSD, and the OSD #2 is requested to access the object.

Similarly, in the case where the workload #1 is deployed to the server 200b, the object name OBJ1-3 is selected from the object information 221a. Then, when the workload #1 accesses the object, the arrangement calculation unit 231b of the server 200b calculates the OSD ID of the primary OSD using the selected object name OBJ1-3. As a result, the OSD #3 in the server 200b is determined to be the primary OSD, and the OSD #3 is requested to access the object.

By such processing, in the node to which the workload is deployed, the primary OSD determined by the arrangement calculation unit becomes the OSD on the same node. Therefore, the arrangement calculation unit outputs the access request for the object to the OSD on the same node. Therefore, the possibility of shortening the access time and improving the access speed occurs.

That is, in the case where a read is requested, the object is read from the OSD in the node to which the workload has been deployed. Furthermore, in the case where a write is requested, the object is first written to the OSD in the node to which the workload has been deployed. Therefore, the possibility of improving the access speed for the object occurs.

Furthermore, in a case where a large number of workloads is deployed by the scheduler 122, or in a case where the deployment destinations of some of the workloads are moved, the read speed and write speed of the object can be improved as a whole.

Hereinafter, the processing in the present embodiment will be described in more detail.

Figure 11:
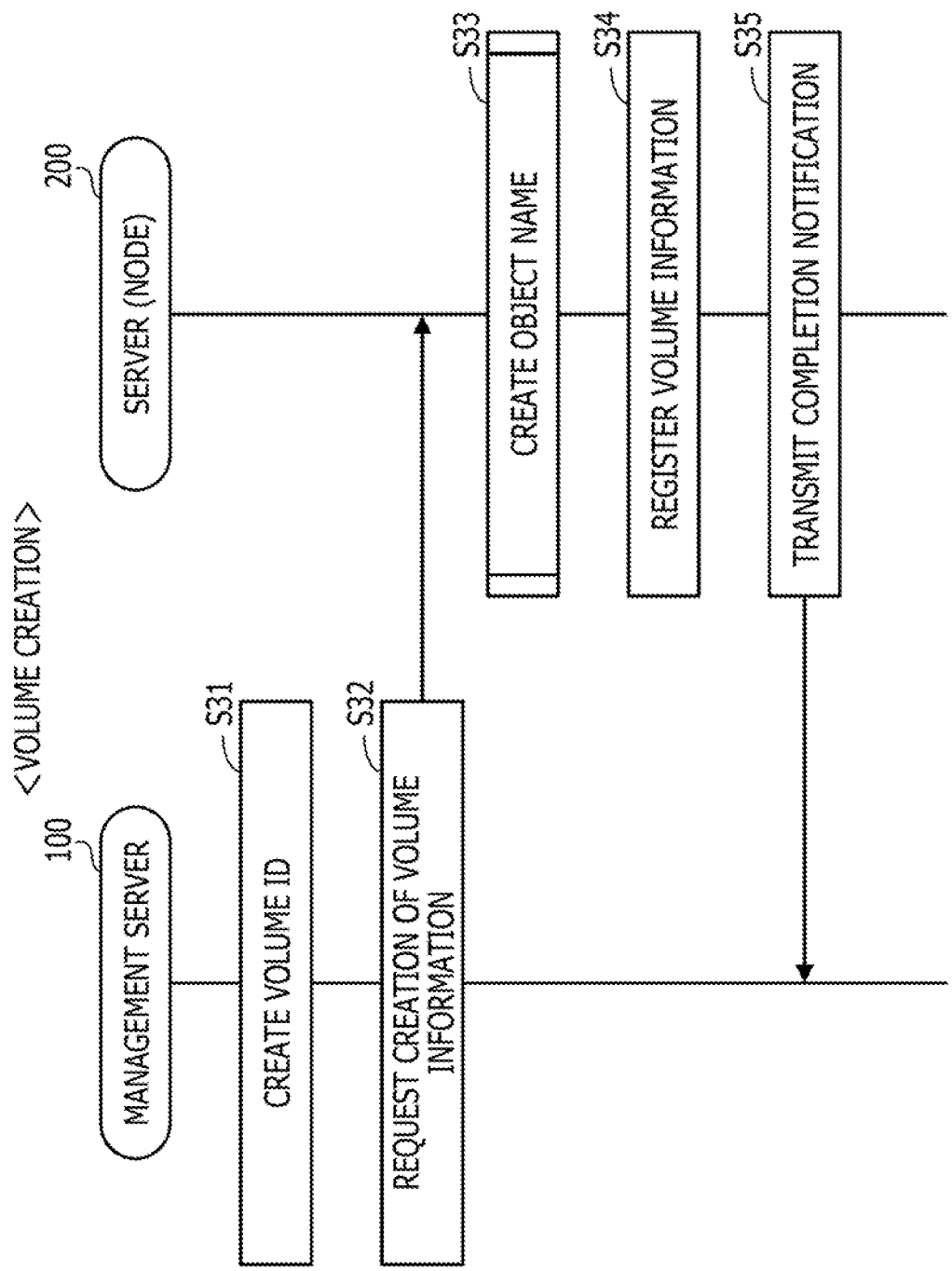
FIG. 11 is an example of a sequence diagram illustrating a processing procedure of creating a volume.

First FIG. 11 is an example of a sequence diagram illustrating a processing procedure of creating a volume.

[step S31] The volume creation unit 121 of the management server 100 creates a volume ID indicating a new volume. The volume creation unit 121 registers the created volume ID in the workload information 111 in association with the workload.

[step S32] The volume creation unit 121 transmits the created volume ID to any of the servers 200, 200a, 200b, and the like to request creation of volume information. For example, a predetermined specific server is requested to create the volume information. Alternatively, all of the servers 200, 200a, 200b, and the like may be inquired about whether or not to be able to execute processing, and a server that returns a response that the processing is executable may be requested to create the volume information. Furthermore, when requesting creation of the volume information, the volume creation unit 121 can specify three nodes for arranging replicas of the object corresponding to the volume.

In the following description, it is assumed that the server 200 is requested to create the volume information as an example.

[step S33] The control unit 241 of the server 200 creates the object name of the object to be stored in the volume. In this processing, three object IDs in which combinations of calculated OSD IDs are the same, and the primary OSDs are different from one another are created. Furthermore, the three nodes for storing the replicas of the object are specified in this processing. Note that the details of the processing in step S33 will be described in detail in FIGS. 12 and 13 below.

[step S34] The control unit 241 creates volume information including the volume ID created in step S31 and the three object names and the three node IDs of three nodes created in step S33, and registers the volume information in the volume management table 221. At this time, the control unit 241 registers the content of the volume information at least in the volume management table 221 held in each node specified in step S33. Alternatively, the updated content of the volume management table 221 on the server 200 may be synchronized in all servers (all nodes).

[step S35] The control unit 241 transmits a completion notification indicating that creation of the volume information has been completed to the management server 100.

Figure 12:
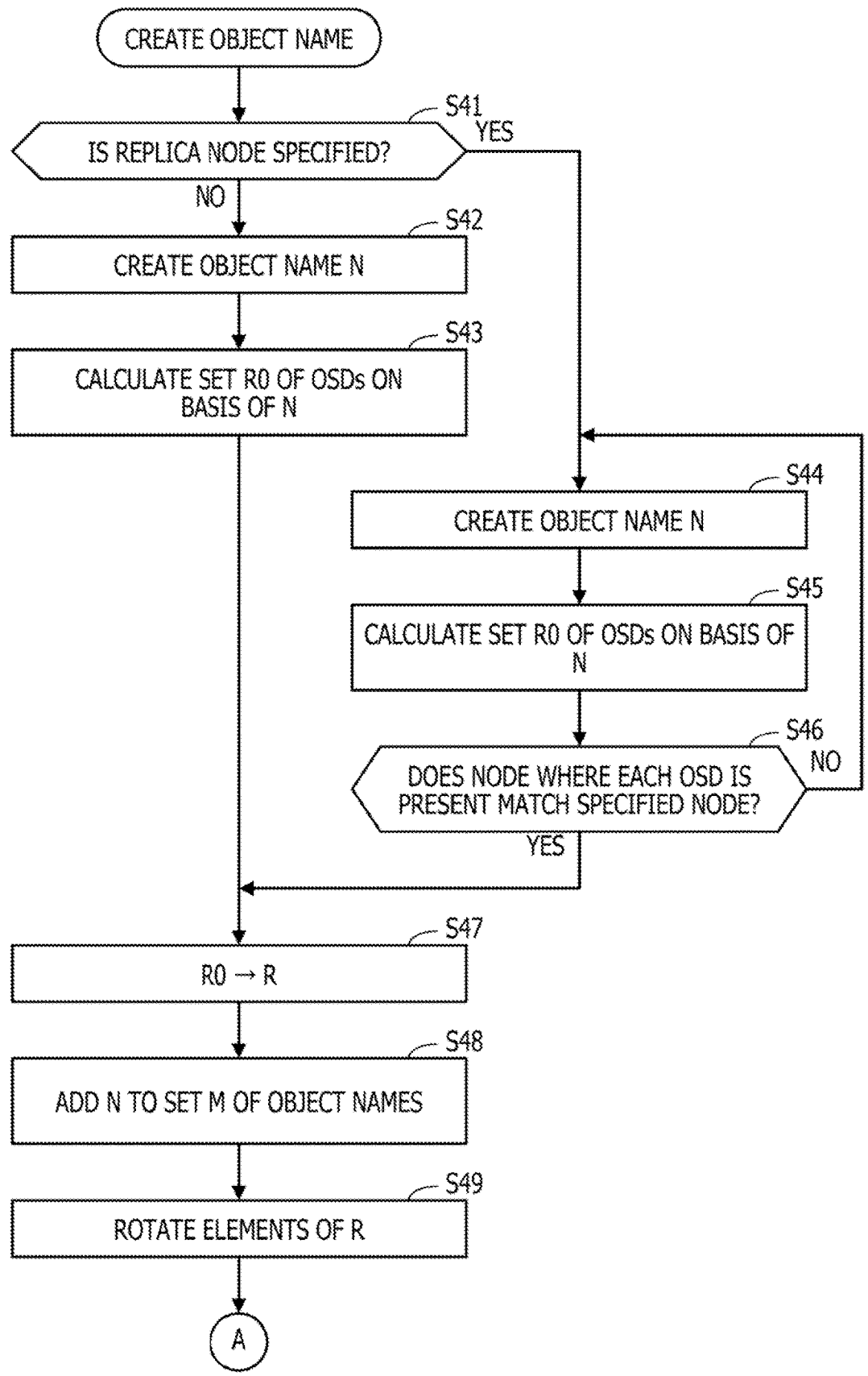
FIG. 12 is an example (No. 1) of a flowchart illustrating a processing procedure of creating an object name.
Figure 13:
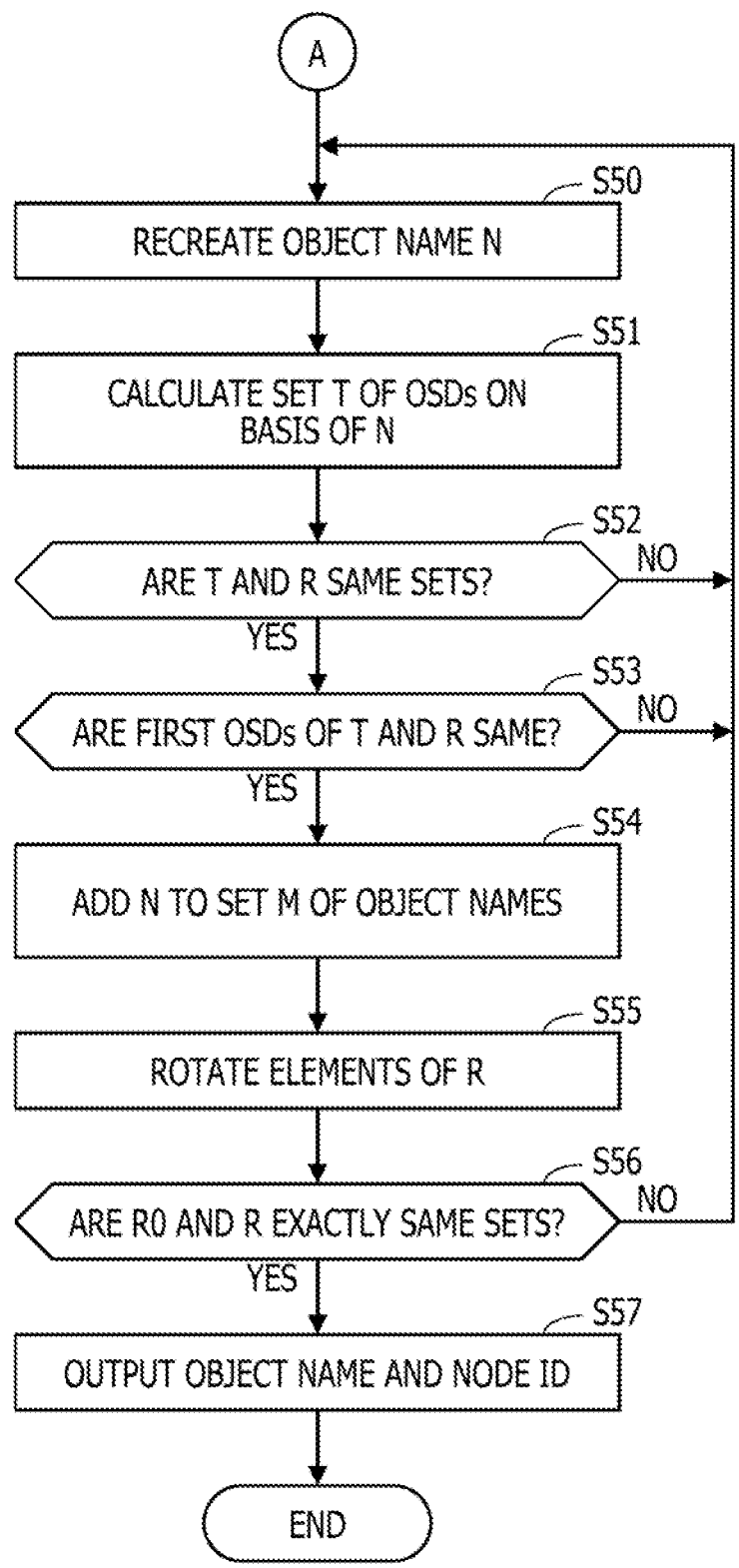
FIG. 13 is an example (No. 2) of a flowchart illustrating a processing procedure of creating an object name.

FIGS. 12 and 13 are examples of a flowchart illustrating a processing procedure of creating an object name. The processing in FIGS. 12 and 13 correspond to the processing in in step S33 illustrated in FIG. 11.

[step S41] The control unit 241 of the server 200 determines whether a node (replica node) for arranging the replica of the object corresponding to the volume has been specified. The control unit 241 advances the processing to step S42 in the case where no replica node is specified, or advances the processing to step S44 in the case where the replica node is specified.

[step S42] The control unit 241 creates an object name N. For example, the object name N is created by incrementally or randomly generating a bit string having a fixed number of bits.

[step S43] The control unit 241 calculates a set RO of OSDs using the PG calculation unit 242 and the OSD calculation unit 243 on the basis of the created object name N. For example, the PG calculation unit 242 calculates the PG ID on the basis of the object name N. The OSD calculation unit 243 calculates the OSD IDs of the primary OSD and the two secondary OSDs on the basis of the calculated PG ID and the cluster map 222. In this processing, the replica numbers idx=0, 1, 2 are respectively input as the arguments to the function choose_replica, and the OSD IDs of the above three OSDs are calculated. The calculated three OSD IDs are included in the set RO in the order of calculation when the replica numbers idx=0, 1, 2 are input in order.

[step S44] The control unit 241 creates the object name N in a similar procedure to in step S42.

[step S45] The control unit 241 calculates a set RO of OSDs using the PG calculation unit 242 and the OSD calculation unit 243 on the basis of the created object name N. This calculation is performed in a similar procedure to step S43.

[step S46] The control unit 241 determines whether the combination of nodes including each of the OSD included in the set RO matches the combination of replica nodes specified by the scheduler 122. In this determination, match is determined when the combinations are the same regardless of the order of nodes. The control unit 241 advances the processing to step S47 in the case where the combinations of nodes match, or advances the processing to step S44 in the case where the combinations of nodes do not match. In the latter case, the object name N is recreated.

[step S47] The control unit 241 includes the OSD IDs included in the calculated set RO of OSDs with an set R in a state of maintaining the order.

[step S48] The control unit 241 adds the object name N to a set M of object names. As a result, one object name is confirmed. At this stage, one object name is present in the set M.

[step S49] The control unit 241 rotates elements (OSD IDs) in the set R. In this processing, a first element in the set R is moved to the end, and a second element is changed to the first element.

[step S50] The control unit 241 recreates the object name N in a similar procedure to in step S42 or S44.

[step S51] The control unit 241 calculates a set T of OSDs using the PG calculation unit 242 and the OSD calculation unit 243 on the basis of the recreated object name N. This calculation is performed in a similar procedure to step S43 or S45.

[step S52] The control unit 241 determines whether the combination of OSDs included in the calculated set T is the same as the combination of OSDs included in the current set R. In this determination, the same is determined when the combinations are the same regardless of the order of OSDs. The control unit 241 advances the processing to step S53 in the case where the combinations of OSDs are the same, or advances the processing to step S50 in the case where the combinations of OSDs are not the same. In the latter case, the object name N is recreated.

[step S53] The control unit 241 determines whether the first OSD in the set T is the same as the first OSD in the set R. The control unit 241 advances the processing to step S54 in the case where these OSDs are the same, or advances the processing to step S50 in the case where these OSDs are not the same. In the latter case, the object name N is recreated.

[step S54] The control unit 241 further adds the current object name N to the set M of object names. As a result, the next object name is confirmed.

[step S55] The control unit 241 rotates the elements (OSD IDs) in the set R. In this processing, the first element in the set R is moved to the end, and the second element is changed to the first element, similarly to step S49.

[step S56] The control unit 241 determines whether the set RO and the current set R are exactly the same. Exactly the same is determined in the case where each of the OSD included in the set RO and the OSDs included in the set R together with the order match. The control unit 241 advances the processing to step S57 in the case where these sets are exactly the same. In this case, the first element in the set R in the initial state (the state in which step S47 is executed) is returned to the beginning again by the rotation in step S55, and the three created object names are included in the set M. Meanwhile, in the case where the set RO and the set R are different, the control unit 241 advances the processing to step S50. In this case, the processing of creating the next object name is started.

[step S57] The node IDs of the nodes (replica nodes) in which the three OSDs included in the set R are respectively present. Note that, in the case where the replica node is specified from the scheduler 122 (in the case of "Yes" in step S41), the node ID of the specified replica node only has to be used as it is.

The control unit 241 outputs the three object names included in the set M and the node IDs of the three replica nodes.

In the above processing, three object names that satisfy the conditions that the combinations of the calculated OSD IDs are the same and the primary OSDs are different from one another are searched while changing the object names.

FIG. 14 is a diagram illustrating a configuration example of a volume management table. The volume ID, the object name, the node set, and a primary flag are registered in the volume management table 221 in association with one another.

The volume ID indicates an identification number of the volume. The object name indicates an identification name of the object stored in the volume. As the object name, three object names created by the above processing for the same object are registered. The node set indicates the node ID of each node in which the replica of the object is stored. Each primary flag is associated with an object name.

The primary flag is flag information for identifying the object name used at the time of access among the object names of the same object. The "object name used at the time of access" refers to an object name that calculates the OSD on its own node as the primary OSD in the node in which the volume management table 221 is held. An initial value of the primary flag is "0", and the primary flag corresponding to the object name used at the time of access is set to "1".

Figure 15:
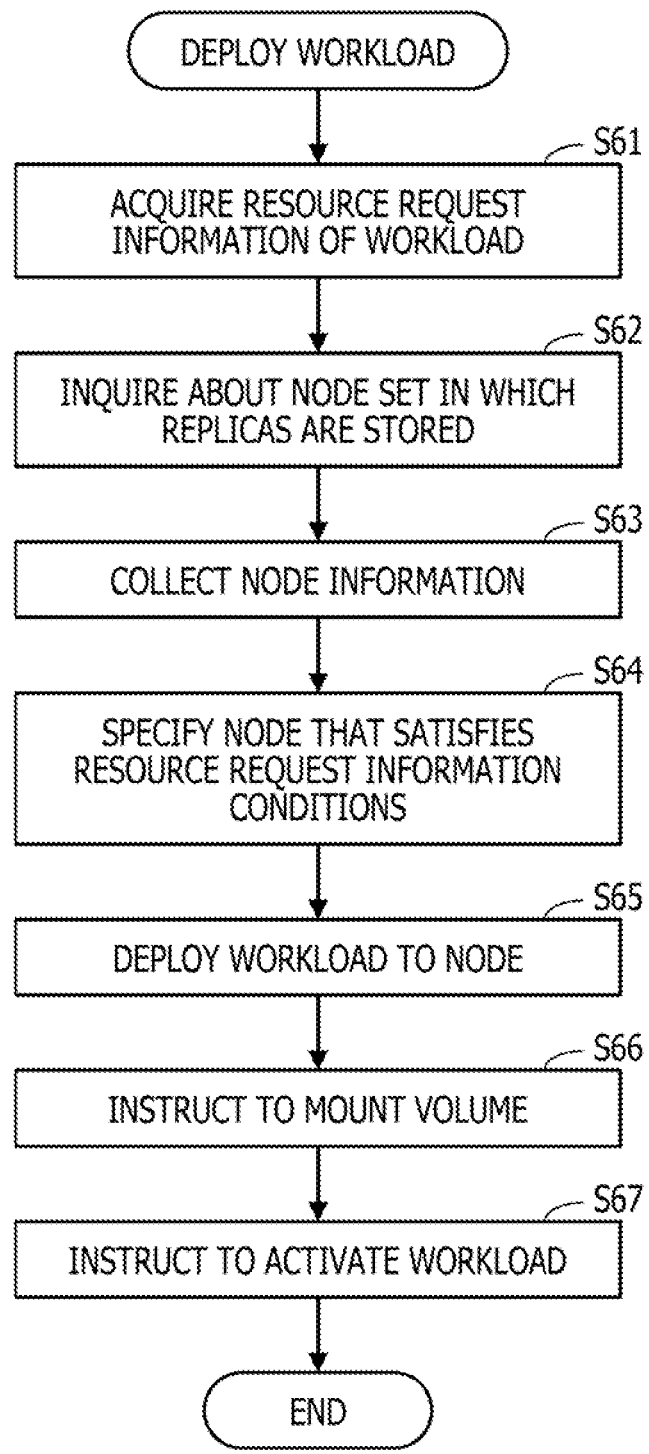
FIG. 15 is an example of a flowchart illustrating a processing procedure of workload deployment.

FIG. 15 is an example of a flowchart illustrating a processing procedure of workload deployment.

[step S61] The scheduler 122 of the management server 100 acquires the resource request information corresponding to the workload to be deployed from the workload information 111.

[step S62] The scheduler 122 acquires the volume ID corresponding to the workload to be deployed from the workload information 111. The scheduler 122 transmits the volume ID to the node (server) and inquiries about a set of nodes in which the replicas (replicas of the object in the volume) corresponding to the volume indicated by the volume ID are stored. The scheduler 122 acquires a node set notified in response to the inquiry. The node IDs included in the acquired node set indicate candidate deployment destination nodes for the workload.

In step S62, for example, the inquiry about a node set is transmitted to a plurality of nodes (which may be all the nodes). In the node that has received the inquiry, the control unit 241 refers to the volume management table 221 and notifies the management server 100 of the node set in the case where the volume ID and the corresponding node set are registered. Note that, in the case where the volume management table 221 is synchronized in all the nodes, the scheduler 122 only has to send the inquiry about a node set to any one of the nodes.

[step S63] The scheduler 122 collects node information from each node included in the acquired node set. As the node information, information indicating the resource usage status of the CPU, memory, and the like in the node is collected. For example, a CPU usage rate, a memory usage rate, and the like are collected.

[step S64] The scheduler 122 identifies a node that satisfies the conditions indicated by the resource request information from among the nodes included in the node set on the basis of the node information of each node collected in step S63. For example, a node having the CPU usage rate equal to or higher than a value included in the resource request information, and having the memory usage rate equal to or higher than a value included in the resource request condition is specified. Thereby, the node in a state suitable for executing the workload is specified.

Note that, in a case where the node that satisfies all the conditions indicated by the resource request information is not present, a node that satisfies a largest number of conditions of the plurality of conditions included in the resource request information only has to be specified. Alternatively, a node having the resource usage status closest to the conditions indicated by the resource request information may be specified.

[step S65] The scheduler 122 deploys the workload to the identified node. For example, a program corresponding to the workload is transmitted to the specified node and installed on the node.

[step S66] The scheduler 122 instructs the workload deployment destination node to mount the volume indicated by the volume ID acquired from the workload information 111 in step S62 on the workload. When the scheduler 122 receives the mount completion notification, the processing proceeds to step S67.

[step S67] The scheduler 122 instructs the workload deployment destination node to activate the deployed workload. Thereby, the workload is activated on the deployment destination node, and the operation of the workload is started.

By the above processing, the workload is deployed to one of the nodes in which the replicas of the object in the volume are stored.

Figure 16:
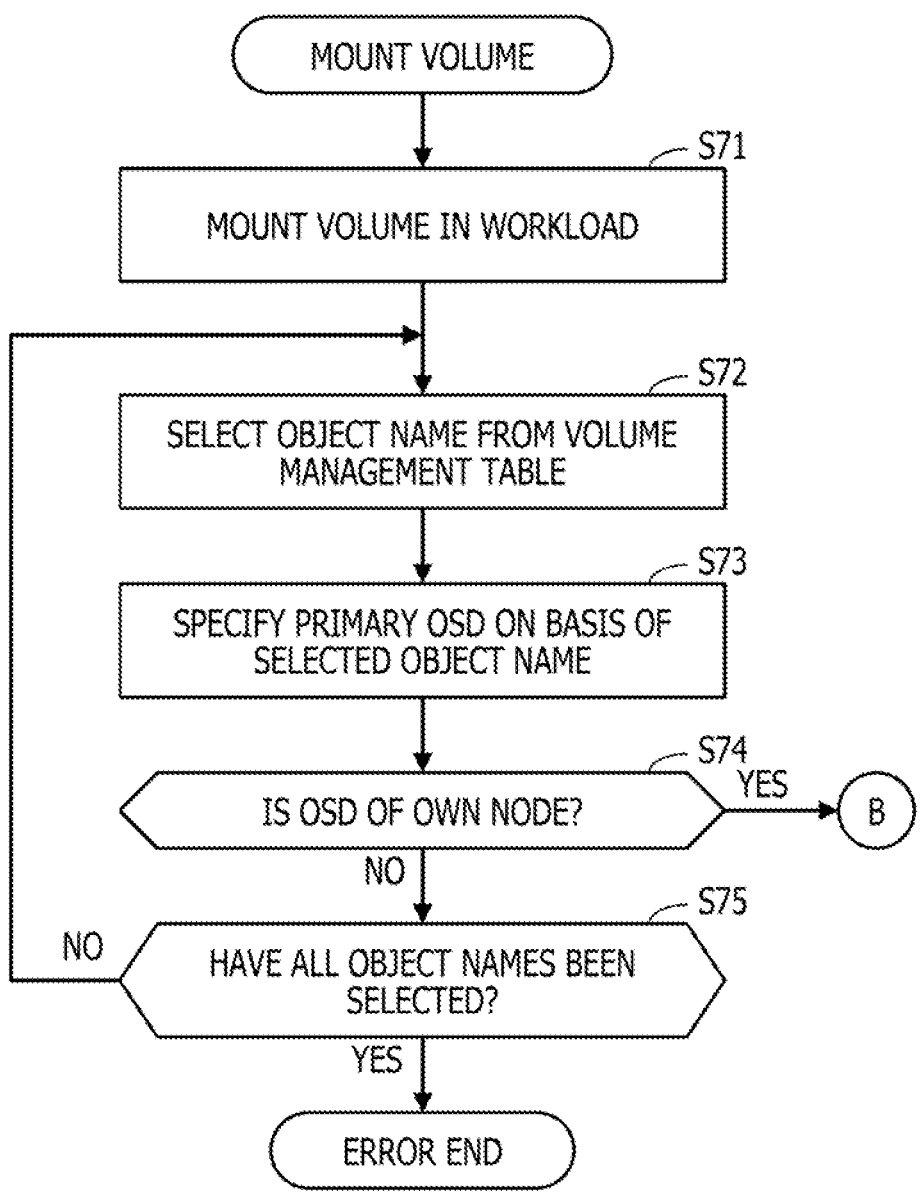
FIG. 16 is an example (No. 1) of a flowchart illustrating a processing procedure of mounting a volume to a workload.
Figure 17:
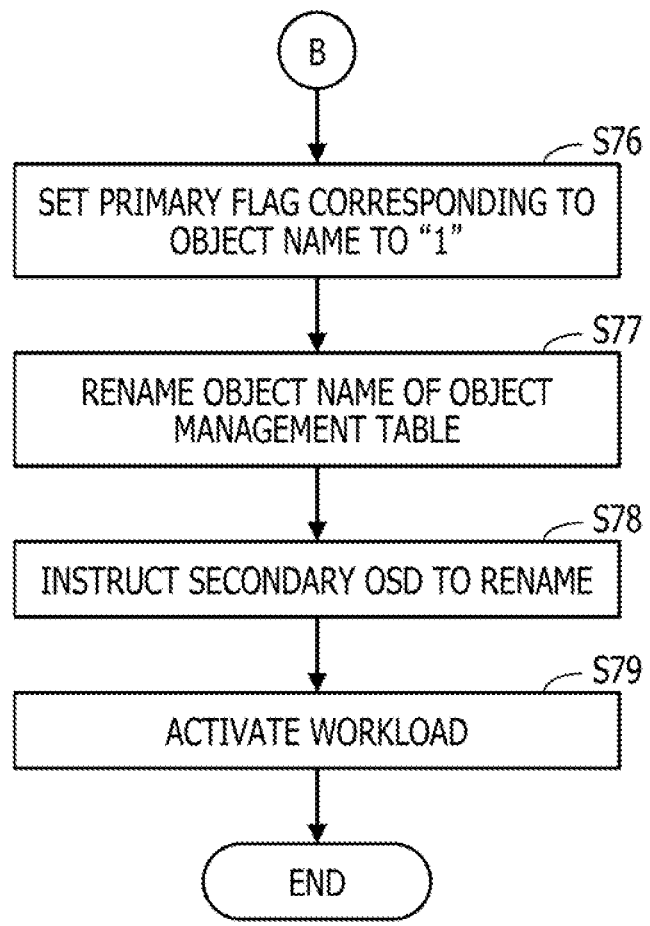
FIG. 17 is an example (No. 2) of a flowchart illustrating a processing procedure of mounting a volume to a workload.

FIGS. 16 and 17 are examples of a flowchart illustrating a processing procedure of mounting a volume to a workload. Here, as an example, a case in which the workload is deployed to the server 200 will be described.

[step S71] When the mount execution instruction is transmitted from the scheduler 122 of the management server 100 in step S66 in FIG. 15, the workload execution unit 201 of the server 200 receives the mount execution instruction together with the volume ID. The workload execution unit 201 mounts the volume indicated by the volume ID on the workload.

[step S72] The workload execution unit 201 notifies the control unit 241 of the volume ID. The control unit 241 refers to the volume management table 221 and selects one of the three object names associated with the notified volume ID.

[step S73] The control unit 241 specifies the primary OSD, using the PG calculation unit 242 and the OSD calculation unit 243 on the basis of the selected object name. For example, the PG calculation unit 242 calculates the PG ID on the basis of the selected object name. The OSD calculation unit 243 calculates the OSD ID of the primary OSD on the basis of the calculated PG ID and the cluster map 222. In this processing, the replica number idx=0 is input as the argument to the function choose_replica, so that the OSD ID is calculated.

[step S74] The control unit 241 determines whether the specified primary OSD is an OSD existing in its own node (here, the server 200). The control unit 241 advances the processing to step S75 in the case where the specified primary OSD is not the OSD existing in its own node, or advances the processing to step S76 in the case where the specified primary OSD is the OSD existing in its own node. In the latter case, the object name selected in the most recent processing in step S73 is determined as a use object name to be used thereafter.

[step S75] The control unit 241 determines whether all the three object names associated with the volume ID in the volume management table 221 have been selected. In a case where there is an unselected object name, the processing proceeds to step S72 and one of the unselected object names is selected from the volume management table 221. Meanwhile, in a case where all the object names have been selected, the processing ends. In this case, an error occurs, such as an inappropriate object name registered in the volume management table 221.

[step S76] The control unit 241 sets the primary flag associated with the determined use object name to "1" in the volume management table 221.

[step S77] The control unit 241 executes rename processing for the object corresponding to the use object name. In this processing, the control unit 241 refers to the object management table 223, and registers the use object name in the object management table 223 in a case where none of the three object names registered in the volume management table 221 is registered. Furthermore, in a case where an object name other than the use object name is registered in the object management table 223 in the three object names registered in the volume management table 221, the control unit 241 updates the object name with the use object name.

[step S78] The control unit 241 instructs the two secondary OSDs determined on the basis of the use object name to execute the rename processing. At this time, the use object name and the other two object names, of the three object names registered in the volume management table 221, are notified to the secondary OSD in a distinguished manner. Note that the secondary OSD is the OSD (device control unit) that exists in another node (server).

The OSD of the other node that receives the instruction refers to the object management table 223 stored in the node and executes rename processing similar to step S77. That is, the OSD registers the use object name in the object management table 223 in the case where none of the three object names are registered in the object management table 223. Furthermore, in the case where an object name other than the use object name is registered in the object management table 223 in the three object names, the OSD updates the object name with the use object name.

[step S79] The workload execution unit 201 activates the deployed workload. Thereby, the operation of the workload is started.

In the above processing in FIGS. 16 and 17, the object name by which the OSD existing in its own node (server 200) is specified as the primary OSD is selected from among the three object names created in advance at the timing when the volume is mounted to the workload. Then, the primary flag corresponding to the selected object name is set to "1" so that the selected object name is used thereafter.

Figure 18:
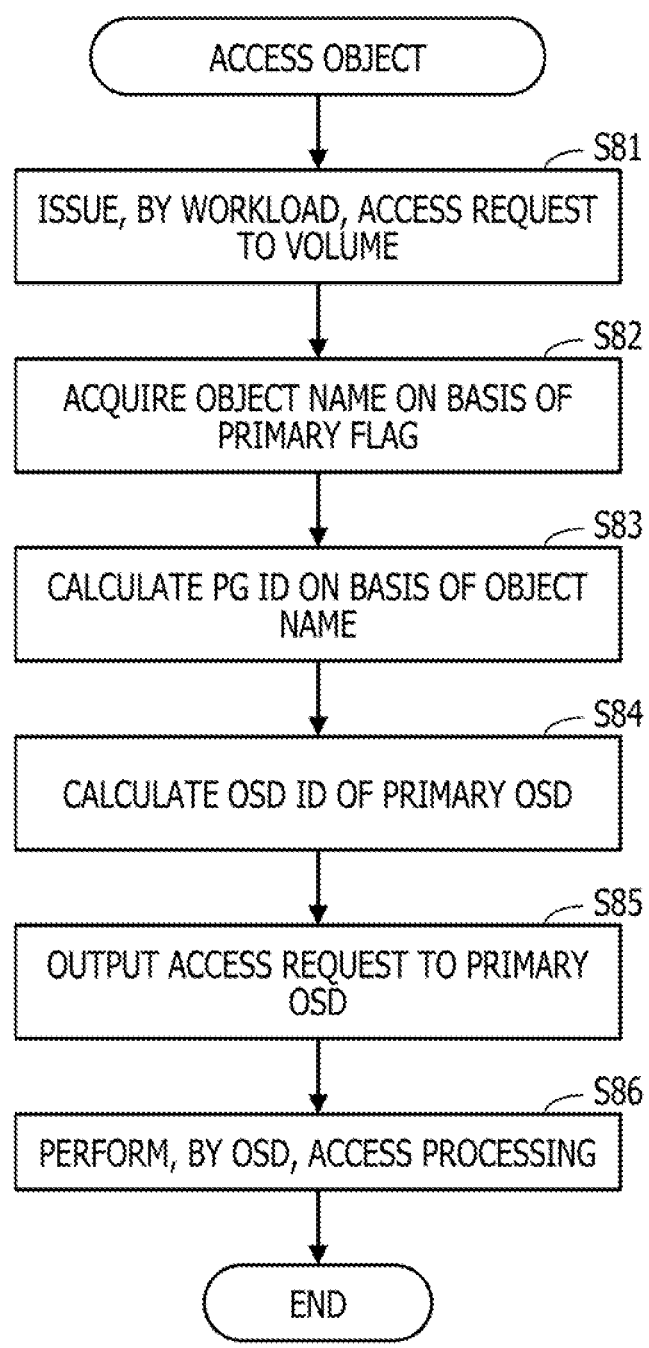
FIG. 18 is an example of a flowchart illustrating a processing procedure of accessing an object.

FIG. 18 is an example of a flowchart illustrating a processing procedure of accessing an object. Here, as an example, it is assumed that the workload deployed to the server 200 is executed by the workload execution unit 201.

[step S81] The workload issues the access request for the volume. As a result, the access request is output from the workload execution unit 201 to the storage control unit 202 together with the volume ID.

[step S82] The control unit 241 refers to the volume management table 221 and acquires the object name with the primary flag of "1" among the three object names associated with the input volume ID.

[step S83] The PG calculation unit 242 calculates the PG ID on the basis of the acquired object name.

[step S84] The OSD calculation unit 243 calculates the OSD ID of the primary OSD on the basis of the calculated PG ID and the cluster map 222. For example, the OSD ID is calculated by inputting the replica number idx=0 as the argument of the function choose_replica.

[step S85] The OSD calculation unit 243 specifies the object name acquired in step S82 for the primary OSD indicated by the calculated OSD ID, and outputs the access request for the corresponding object. The output destination at this time is the OSD (device control unit 232) present in its own node (that is, the server 200).

[step S86] The access processing by the primary OSD is executed. In the case where a read of the object is requested, the OSD (the device control unit 232 of the server 200) on the output destination in step S85 reads the object from the corresponding local storage 203 on the basis of the object management table 223. This read is executed on the basis of the object name and storage location information registered in the object management table 223. At this time, since the object name specified in the read request is registered in the object management table 223 by the processing in step S77 in FIG. 17, the OSD can correctly read the appropriate object. The read object is output to the workload execution unit 201, and the read completion notification is output from the storage control unit 202 to the workload execution unit 201. Thereby, the object is used by the workload.

Meanwhile, in the case where the write of the object is requested, the processing illustrated in FIG. 19 below is executed.

FIG. 19 is an example of a sequence diagram illustrating a processing procedure of writing an object.

[step S91] The OSD (device control unit 232) of the server 200 writes the object in the corresponding local storage 203. Here, in the case of the first write of the object (that is, in the case where the write is not an update), the storage location information is registered in association with the object name specified in the write request registered in the object management table 223.

[step S92] The OSD of the server 200 notifies the arrangement calculation unit 231 of the object name and requests the calculation of the OSD ID indicating the secondary OSD. In the arrangement calculation unit 231, the PG calculation unit 242 calculates the PG ID on the basis of the object name. The OSD calculation unit 243 calculates the OSD ID of the secondary OSD on the basis of the calculated PG ID and the cluster map 222. For example, the OSD IDs are respectively calculated by inputting the replica numbers idx=1, 2 as the arguments of the function choose_replica.

Note that the OSD ID calculation processing in step S92 may be executed by the OSD itself of the server 200.

Hereinafter, the description will be given assuming that the OSDs existing in the servers 200a and 200b are specified as the secondary OSDs.

[step S93a] The OSD of the server 200 transfers the object to the OSD of the server 200a and gives an instruction to write the object.

[step S93b] The OSD of the server 200 transfers the object to the OSD of the server 200b and gives an instruction to write the object.

[step S94a] The OSD (device control unit 232a) of the server 200a writes the object in the corresponding local storage. When the write is completed, the OSD of the server 200a transmits the completion notification to the OSD of the server 200.

[step S94b] The OSD (device control unit 232b) of the server 200b writes the object in the corresponding local storage. When the write is completed, the OSD of the server 200b transmits the completion notification to the OSD of the server 200.

[step S95] When the OSD of the server 200 receives the write completion notification from both the OSD of the server 200a and the OSD of the server 200b, the OSD of the server 200 outputs response information indicating the write completion to the arrangement calculation unit 231. The response information is transferred from the arrangement calculation unit 231 to the workload execution unit 201, and the workload being executed receives the response information.

In the above-described second embodiment, a plurality of object names that satisfies the conditions that the combinations of the calculated OSD IDs are the same, and the primary OSDs are different from one another is created in advance for the object to be accessed by the workload. The plurality of object names is retained in the respective replica nodes.

In the replica node to which the workload is deployed, the object name by which the OSD existing in the replica node is specified as the primary OSD when arrangement calculation is performed is selected as the use object name from among the plurality of object names. Then, when an access to the object is requested according to the execution of the workload, the arrangement calculation unit 231 calculates the primary OSD using the selected use object name.

As a result, the access request from the arrangement calculation unit 231 is output to the OSD on the node to which the workload is deployed. In the case where a read is requested, the OSD reads the object, and when a write is requested, the OSD writes the object first.

Thereby, the possibility of improving the access speed for the object occurs. That is, the number of transfers the object between nodes is reduced (the number of transfers is "0" in the case of the read request), as compared with the case of using only one object name and calculating that the primary OSD is present in another node from the object name. Therefore, the access speed is improved. Furthermore, in the case where a large number of workloads is deployed or in the case where the deployment destinations of some of the workloads are moved, the access speed of the object can be improved as a whole. Furthermore, since the number of object transfers between nodes is reduced, the load on the network 50 can be reduced.

Furthermore, in the second embodiment, the effect of improving the access speed from the workload to the object can be expected while deploying the workload to the node that satisfies the resource conditions for the workload and enabling the node to execute the workload. For example, a method of using only one object name and deploying the workload to the node including the primary OSD calculated from the object name is also conceivable. However, this method does not necessarily allow the workload to be executed on the appropriate node that satisfies the resource conditions. According to the second embodiment, the workload can be executed in the appropriate node. Therefore, both optimization of deployment of the workload and optimization of the object on the access destination can be achieved.

Note that the processing functions of the devices described in each of the above embodiments (for example, the management device 1, the information processing devices 2a to 2d, the management server 100, and the servers 200, 200a, 200b, and the like) can be implemented by a computer. In that case, a program describing the processing content of the functions to be held by each device is provided, and the above processing functions are implemented on the computer by execution of the program on the computer. The program describing the processing content can be recorded on a computer-readable recording medium. The computer-readable recording medium includes a magnetic storage device, an optical disc, a magneto-optical recording medium, a semiconductor memory, or the like. The magnetic storage device includes a hard disk drive (HDD), a magnetic tape, or the like. The optical disc includes a Compact Disc (CD), a Digital Versatile Disc (DVD), a Blu-ray Disc (BD, registered trademark), or the like. The magneto-optical recording medium includes a Magneto-Optical (MO) disk or the like.

In a case where the program is to be distributed, for example, portable recording media such as DVDs and CDs, in which the program is recorded, are sold. Furthermore, it is possible to store the program in a storage device of a server computer and transfer the program from the server computer to another computer through a network.

The computer that executes the program stores, for example, the program recorded on the portable recording medium or the program transferred from the server computer in its own storage device. Then, the computer reads the program from the storage device of the computer and executes processing according to the program. Note that, the computer can also read the program directly from the portable recording medium and execute processing according to the program. Furthermore, the computer can also sequentially execute processing according to the received program each time when the program is transferred from the server computer connected via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
store, in a case where each of a plurality of information processing devices including the information processing device stores one object of a plurality of objects, a plurality of pieces of first identification information which each identifies a first object of the plurality of objects and are assigned to each of a plurality of first information processing devices of the plurality of information processing devices, the plurality of pieces of first identification information are set in such a manner that the plurality of first information processing devices are specified by executing a calculation, using each of the plurality of pieces of identification information, which specifies a primary device that serves as a read sources of the first object and the plurality of first information processing devices have a different primary device from one another;

specify one piece of first identification information in which the information processing device is used as the primary device from among the plurality of pieces of first identification information;

read the first object from the primary device which is specified by the one piece of first identification information when executing a task arranged by control of a management device; and record, in the memory, instruction information indicating the one piece of first identification information specified from among the plurality of pieces of first identification information, and a specification of the primary device based on the one piece of first identification information is executed on a basis of the instruction information, a record of the instruction information is executed when the task is arranged in the information processing device by the control of the management device.

2. The information processing device according to claim 1, wherein the arrangement destination of the task is determined by the management device from among the plurality of information processing devices on a basis of a resource usage status in each of the plurality of information processing devices.

3. The information processing device according to claim 1, wherein the plurality of pieces of first identification information is created by one of the plurality of information processing devices.

4. An information processing system comprising:

a management device; and a plurality of information processing devices which each stores one object of a plurality of objects, the management device determines an arrangement destination of a task from among a plurality of first information processing devices of the plurality of information processing devices, each of the plurality of first devices stores a plurality of pieces of first identification information which each identifies a first object of the plurality of objects and are assigned to each of a plurality of first information processing devices of the plurality of information processing devices, the plurality of pieces of first identification information are set in such a manner that the plurality of first information processing devices are specified by executing a calculation, using each of the plurality of pieces of identification information, which specifies a primary device that serves as a read sources of the first object and the plurality of first information processing devices have a different primary device from one another specifies one piece of first identification information in which the information processing device is used as the primary device from among the plurality of pieces of first identification information, and reads the first object from the primary device which is specified by the one piece of first identification information when executing the task arranged by control of the management device, the second device further records, in a memory of the second device, instruction information indicating the one piece of first identification information specified from among the plurality of pieces of first identification information, and a specification of the primary device based on the one piece of first identification information is executed on a basis of the instruction information, a record of the instruction information is executed when the task is arranged in the information processing device by the control of the management device.

5. The information processing system according to claim 4, wherein the management device determines the arrangement destination on a basis of a resource usage status in each of the plurality of first information processing devices from among the plurality of first information processing devices.

6. The information processing system according to claim 4, wherein the plurality of pieces of first identification information is created by one of the plurality of information processing devices.

7. An access control method comprising:

by an information processing device, in a case where each of a plurality of information processing devices including the information processing device stores one object of a plurality of objects, referring to a memory configured to store a plurality of pieces of first identification information which each identifies a first object of the plurality of objects and are assigned to each of a plurality of first information processing devices of the plurality of information processing devices, the plurality of pieces of first identification information are set in such a manner that the plurality of first information processing devices are specified by executing a calculation, using each of the plurality of pieces of identification information, which specifies a primary device that serves as a read sources of the first object and the plurality of first information processing devices have a different primary device from one another;

specifying one piece of first identification information in which the information processing device is used as the primary device from among the plurality of pieces of first identification information;

reading the first object from the primary device which is specified by the one piece of first identification information when executing a task arranged by control of a management device; and recording, in the memory, instruction information indicating the one piece of first identification information specified from among the plurality of pieces of first identification information, and a specification of the primary device based on the one piece of first identification information is executed on a basis of the instruction information, a record of the instruction information is executed when the task is arranged in the information processing device by the control of the management device.

* * * * *